(12) United States Patent
Miller et al.

(10) Patent No.: US 7,657,399 B2
(45) Date of Patent: Feb. 2, 2010

(54) METHODS AND SYSTEMS FOR DETECTING DEVIATION OF A PROCESS VARIABLE FROM EXPECTED VALUES

(75) Inventors: John P. Miller, Eden Prairie, MN (US); Ravi Kant, Savage, MN (US)

(73) Assignee: Fisher-Rosemount Systems, Inc., Austin, TX (US)

(*) Notice: Subject to any disclaimer, the term of this patent is extended or adjusted under 35 U.S.C. 154(b) by 412 days.

(21) Appl. No.: 11/492,347

(22) Filed: Jul. 25, 2006

(65) Prior Publication Data

US 2008/0027677 A1   Jan. 31, 2008

(51) Int. Cl.
*G06F 11/30* (2006.01)

(52) U.S. Cl. ........................................... 702/183

(58) Field of Classification Search ......... 702/179–185; 700/108–111, 174, 175; 703/4, 13
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |

(Continued)

FOREIGN PATENT DOCUMENTS

EP   0 612 039 A2   8/1994

(Continued)

OTHER PUBLICATIONS

Du et al., "Automated Monitoring of Manufacturing Processes, Part 1: Monitoring Methods," *J. Engineering for Industry*, vol. 17, No. 2, pp. 121-132 (1995).

(Continued)

*Primary Examiner*—Michael P. Nghiem
*Assistant Examiner*—Cindy H Khuu
(74) *Attorney, Agent, or Firm*—Marshall, Gerstein & Borun LLP

(57) ABSTRACT

In methods and systems that may facilitate detecting abnormal operation in a process plant, values of a process variable are analyzed to determine whether they significantly deviate from expected values. If there is a significant deviation, an indicator may be generated. Analyzing the process variable may include, for example, determining whether a number of values of the process variable are increasingly deviating from expected values, or determining whether the process variable is cycling. Analyzing the process variable may also include, for example, processing and analyzing the process variable to determine whether the process is in a normal state, one or more abnormal states, or an indeterminate state.

15 Claims, 10 Drawing Sheets

U.S. PATENT DOCUMENTS

| | | |
|---|---|---|
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palusamy et al. |
| 5,325,522 A | 6/1994 | Vaughn |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,519,647 A | 5/1996 | DeVille |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,719,767 A | 2/1998 | Jang et al. |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,026,352 A | 2/2000 | Burns et al. |
| 6,033,257 A | 3/2000 | Lake et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,119,047 A | 9/2000 | Eryurek et al. |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,701 B1 | 11/2001 | Pyotsia et al. |
| 6,332,110 B1 | 12/2001 | Wolfe |
| 6,397,114 B1 | 5/2002 | Eryurek et al. |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 | 3/2003 | Eryurek et al. |
| 6,615,090 B1 | 9/2003 | Blevins et al. |
| 6,633,782 B1 | 10/2003 | Schleiss et al. |
| 7,085,610 B2 | 8/2006 | Eryurek et al. |
| 7,233,834 B2 | 6/2007 | McDonald, Jr. et al. |
| 7,526,405 B2 * | 4/2009 | Miller ........................ 702/179 |
| 7,567,887 B2 * | 7/2009 | Emigholz et al. ........... 702/182 |
| 2002/0022894 A1 | 2/2002 | Eryurek et al. |
| 2002/0038156 A1 | 3/2002 | Eryurek et al. |
| 2002/0077711 A1 | 6/2002 | Nixon et al. |
| 2002/0107858 A1 | 8/2002 | Lundahl et al. |
| 2002/0133320 A1 | 9/2002 | Wegerich et al. |
| 2002/0147511 A1 | 10/2002 | Eryurek et al. |

| | | | |
|---|---|---|---|
| 2002/0161940 A1 | 10/2002 | Eryurek et al. | |
| 2002/0163427 A1 | 11/2002 | Eryurek et al. | |
| 2003/0014500 A1 | 1/2003 | Schleiss et al. | |
| 2003/0074159 A1 | 4/2003 | Bechhoefer et al. | |
| 2004/0078171 A1 | 4/2004 | Wegerich et al. | |
| 2005/0060103 A1 | 3/2005 | Chamness | |
| 2005/0197792 A1 | 9/2005 | Haeuptle | |
| 2005/0210337 A1* | 9/2005 | Chester et al. | 714/47 |
| 2005/0256601 A1 | 11/2005 | Lee et al. | |
| 2006/0020423 A1 | 1/2006 | Sharpe | |
| 2006/0052991 A1 | 3/2006 | Pflugl et al. | |
| 2006/0067388 A1 | 3/2006 | Sedarat | |
| 2006/0074598 A1* | 4/2006 | Emigholz et al. | 702/185 |
| 2006/0157029 A1 | 7/2006 | Suzuki et al. | |
| 2006/0265625 A1 | 11/2006 | Dubois et al. | |
| 2007/0005298 A1 | 1/2007 | Allen et al. | |
| 2007/0097873 A1 | 5/2007 | Ma et al. | |
| 2007/0109301 A1 | 5/2007 | Smith | |
| 2008/0097637 A1* | 4/2008 | Nguyen et al. | 700/110 |
| 2008/0208527 A1* | 8/2008 | Kavaklioglu | 702/179 |

FOREIGN PATENT DOCUMENTS

| | | |
|---|---|---|
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| GB | 2 360 357 A | 9/2001 |
| JP | 07152714 | 6/1995 |
| WO | WO-01/79948 A1 | 10/2001 |

OTHER PUBLICATIONS

Pettersson, "Execution Monitoring in Robotics: A Survey," *Robotics and Autonomous Systems*, vol. 53, pp. 73-88 (2005).

International Search Report and Written Opinion for International Application No. PCT/US2007/074259, dated Dec. 12, 2007.

International Search Report and Written Opinion for International Application No. PCT/US2007/074355, dated Dec. 20, 2007.

International Preliminary Report on Patentability for Application No. PCT/US2007/074259, dated Feb. 5, 2009.

International Preliminary Report on Patentability for Application No. PCT/US2007/074355, dated Feb. 5, 2009.

Non-Final Office Action mailed Apr. 27, 2009 (U.S. Appl. No. 11/492,460).

"Control Charts as a Tool in SQC (Statistical Quality Control)" Control Charts as a Tool in SQC, available at <http://deming.eng.clemson.edu/pub/tutorials/qctools/ccmain1.htm> on May 30, 2006.

"Customer Benefits," GE Industrial Systems, available at <http://www.geindustrial.com/cwc/services?id=75> on Jul. 18, 2002.

"Customer Impact," GE Industrial Systems, available at <http://www.geindustrial.com/cwc/services?id=73> on Jul. 18, 2002.

"Electrical Equipment Coverage," GE Industrial Systems, available at <http://www.geindustrial.com/cwc/services?id=72> on Jul. 18, 2002.

"GE Predictor™ Services—Services Information," GE Industrial Systems, available at <http://www.geindustrial.com/cwc/services?id=71> on Jul. 18, 2002.

"Predictor™ Services," GE Industrial Systems, available at <http://www.geindustrial.com/cwc/services?id=74> on Jul. 18, 2002.

"Root Cause Diagnostics Snap-On Application," Emerson Process Management, available at <http://www.documentation.emersonprocess.com/gaps/public/documents/data_sheets/allds04ole_ROOTCx.pdf>, on Dec. 2003.

"Root Cause Diagnostics: Software for Diagnosing Problems in Typical Industrial Loops," Kavaklioglu et al., presented at Maintenance and Reliability Conference (MARCON 2002), Knoxville, TN, May 2002.

U.S. Appl. No. 11/492,460, "Methods and Systems for Detecting Deviation of a Process Variable from Expected Values" Miller et al., filed Jul 25, 2006.

Ashish Mehta, et al., "Feedforward Neural Networks for Process Identification and Prediction," presented at ISA 2001, Houston, Texas, Sep. 2001.

Chiang et al., "Fault Detection and Diagnosis in Industrial Systems," pp. 70-83, Springer-Verlag London Berlin Heidelberg (2001).

Hines et al., "Sensor Validation and Instrument Calibration Monitoring," *University of Tennesse Maintenance and Reliability Center* (2001).

Horch, "Oscillation Diagnosis in Control Loops—Stiction and Other Causes," Proceedings of the 2006 American Control Conference, Minneapolis, Minnesota, pp. 2086-2096 (2006).

Romeu, "Understanding Binomial Sequential Testing," *START: Selected Topics in Assurance Related Technologies*, 12(2):1-8 (2005).

Ruel, "Diagnose Loop Behavior to Find and Correct Problems with Final Control Elements, the Environment, and Upstream Systems Before You Tune the Controller," Loop Optimization, available at <http://www.expertune.com/artConApr99.html> on Jun. 1, 2006.

Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html> on May 31, 2006.

Vasiliki Tzovla, et al., "Abnormal Condition Management Using Expert Systems," presented at ISA 2001, Houston, Texas, Sep. 2001.

Wald, "Sequential Tests of Statistical Hypotheses," *Ann. Math. Statist.*, 16(2):117-186 (1945).

Wernwe Kalkhoff, "Agent-Oriented Robot Task Transformation", Proceedings of the International Symposium on Intelligent Control, IEEE, pp. 242-247 (Aug. 27, 1995).

Official Office Action for U.S. Appl. No. 11/492,460, dated Jan. 17, 2007.

\* cited by examiner

METHODS AND SYSTEMS FOR DETECTING DEVIATION OF A PROCESS VARIABLE FROM EXPECTED VALUES

CROSS-REFERENCES TO RELATED APPLICATIONS

This application is related to the following commonly-owned, co-pending patent application: U.S. patent application Ser. No. 11/492,460, entitled "METHODS AND SYSTEMS FOR DETECTING DEVIATION OF A PROCESS VARIABLE FROM EXPECTED VALUES," filed on the same day as the present application. The above-referenced patent application is hereby incorporated by reference herein, in its entirety.

TECHNICAL FIELD

This disclosure relates generally to process control systems and, more particularly, to systems for monitoring and/or modeling processes.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamps) signals to and from the process controller via an analog bus or analog lines. These 4 to 20 mA signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self calibration, identification, diagnostics, etc. A number of standard and open smart device communication protocols such as the HART®, PROFIBUS®, WORLDFIP®, Device Net®, and CAN protocols, have been developed to enable smart field devices made by different manufacturers to be used together within the same process control network. Moreover, the all digital, two wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-integral-derivative (PID) control routine. The different function blocks within a process control system are configured to communicate with each other (e.g., over a bus) to form one or more process control loops, the individual operations of which are spread throughout the process and are, thus, decentralized.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the AMS™ Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then be sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Other techniques have been developed to monitor and detect problems in a process plant. One such technique is referred to as Statistical Process Control (SPC). SPC has been used to monitor variables, such as quality variables, associated with a process and flag an operator when the quality variable is detected to have moved from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large sample's average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Another technique analyzes multiple variables and is referred to as multivariable statistical process control (MSPC). This technique uses algorithms such as principal component analysis (PCA) and projections to latent structures (PLS) which analyze historical data to create a statistical model of the process. In particular, samples of variables corresponding to normal operation and samples of variables corresponding to abnormal operation are analyzed to generate a model to determine when an alarm should be generated. Once the model has been defined, variables corresponding to a current process may be provided to the model, which may generate an alarm if the variables indicate an abnormal operation.

With model-based performance monitoring system techniques, a model is utilized, such as a correlation-based model or a first-principles model, that relates process inputs to process outputs. The model may be calibrated to the actual plant operation by adjusting internal tuning constants or bias terms. The model can be used to predict when the process is moving into an abnormal region and alert the operator to take action. An alarm may be generated when there is a significant deviation in actual versus predicted behavior or when there is a big change in a calculated efficiency parameter. Model-based performance monitoring systems typically cover as small as a single unit operation (e.g. a pump, a compressor, a heater, a column, etc.) or a combination of operations that make up a process unit (e.g. crude unit, fluid catalytic cracking unit (FCCU), reformer, etc.)

SUMMARY OF THE DISCLOSURE

Example methods and systems are disclosed that may facilitate detecting abnormal operation in a process plant. Generally speaking, values of a process variable are analyzed to determine whether they significantly deviate from expected values. If there is a significant deviation, an indicator may be generated. A significant deviation may indicate abnormal operation. The process variable may be, for example, a measured process variable or a signal generated by processing a measured variable. For example, the process variable could be a mean signal or some other statistical signal generated by processing a measured process variable. As another example, the process variable could be a signal generated by filtering a measured process variable. The expected values could comprise one or more nominal values of the process variable, an output of a model of the process variable, etc.

In one aspect, example methods and systems are disclosed in which a process variable is analyzed to determine whether a number of values are increasingly deviating from expected values. If it is determined that the number of values are increasingly deviating from the expected values, an indicator of significant deviation may be generated. In one example implementation, a difference signal may be generated based on the process variable and the output of a model. The difference signal may be analyzed to detect whether a first number of values of the difference signal are greater than zero and are consecutively increasing. Additionally or alternatively, the difference signal may be analyzed to detect whether a second number of values of the difference signal are less than zero and are consecutively decreasing.

In another aspect, example methods and systems are disclosed in which a process variable is analyzed to determine whether it is cycling with respect to expected values. If it is determined that the process variable is cycling with respect to the expected values, an indicator of significant deviation may be generated. In one example implementation, the expected values may be generated by a model.

In yet another aspect, example methods and systems are disclosed in which a process variable may be processed to generate a processed signal. Based on the processed signal, it may be determined whether the process is in a normal state, one or more abnormal states, or an indeterminate state. If it is determined that the process is in an abnormal state, an indicator of a significant deviation may be generated.

DETAILED DESCRIPTION

Figure 1:
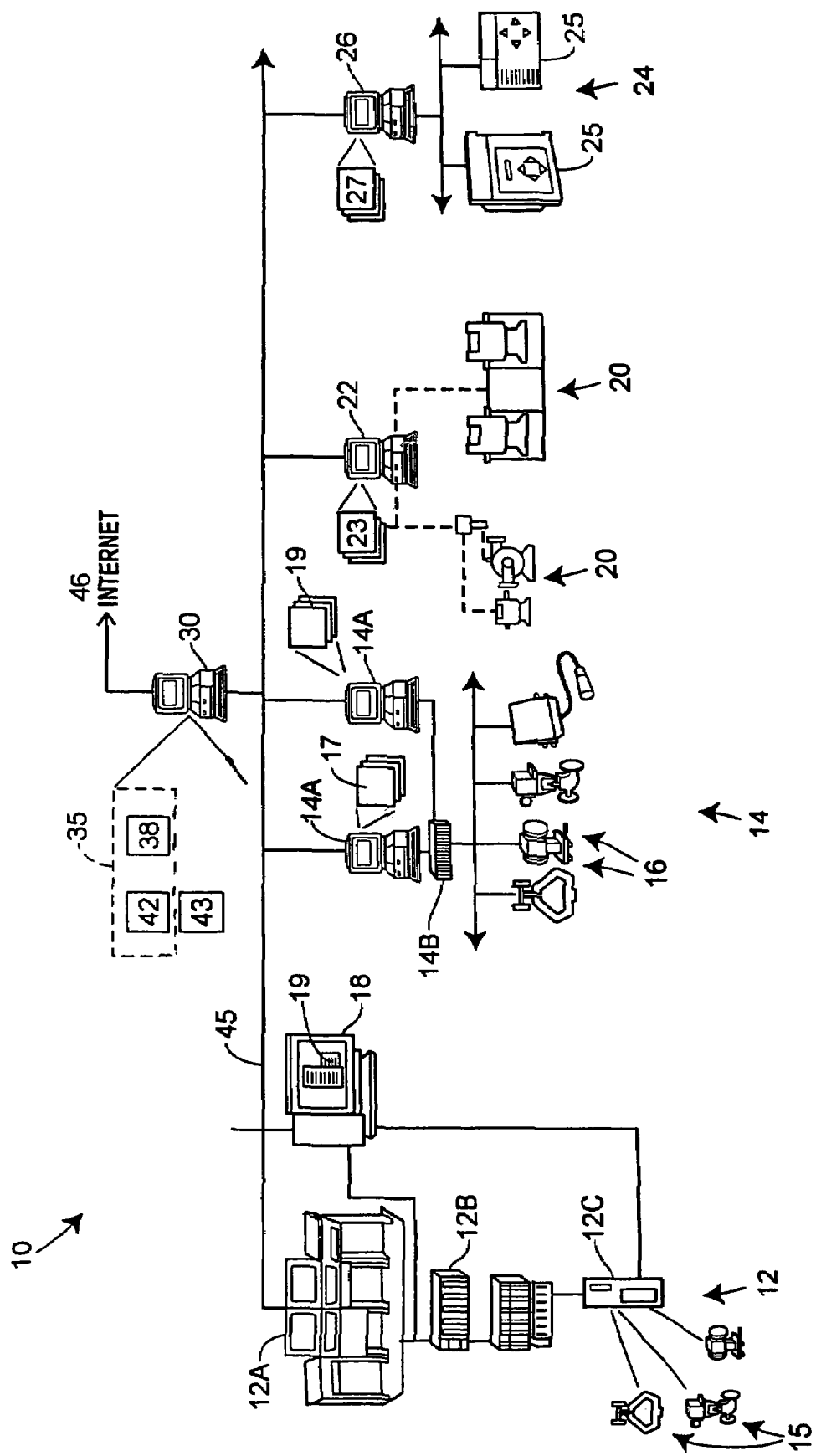
FIG. 1 is a block diagram of an example process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, which will be described in more detail below. Additionally, the computer system 30 may implement an alert/alarm application 43.

Generally speaking, the abnormal situation prevention system 35 may communicate with abnormal operation detection systems (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on hand-held devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

Figure 2:
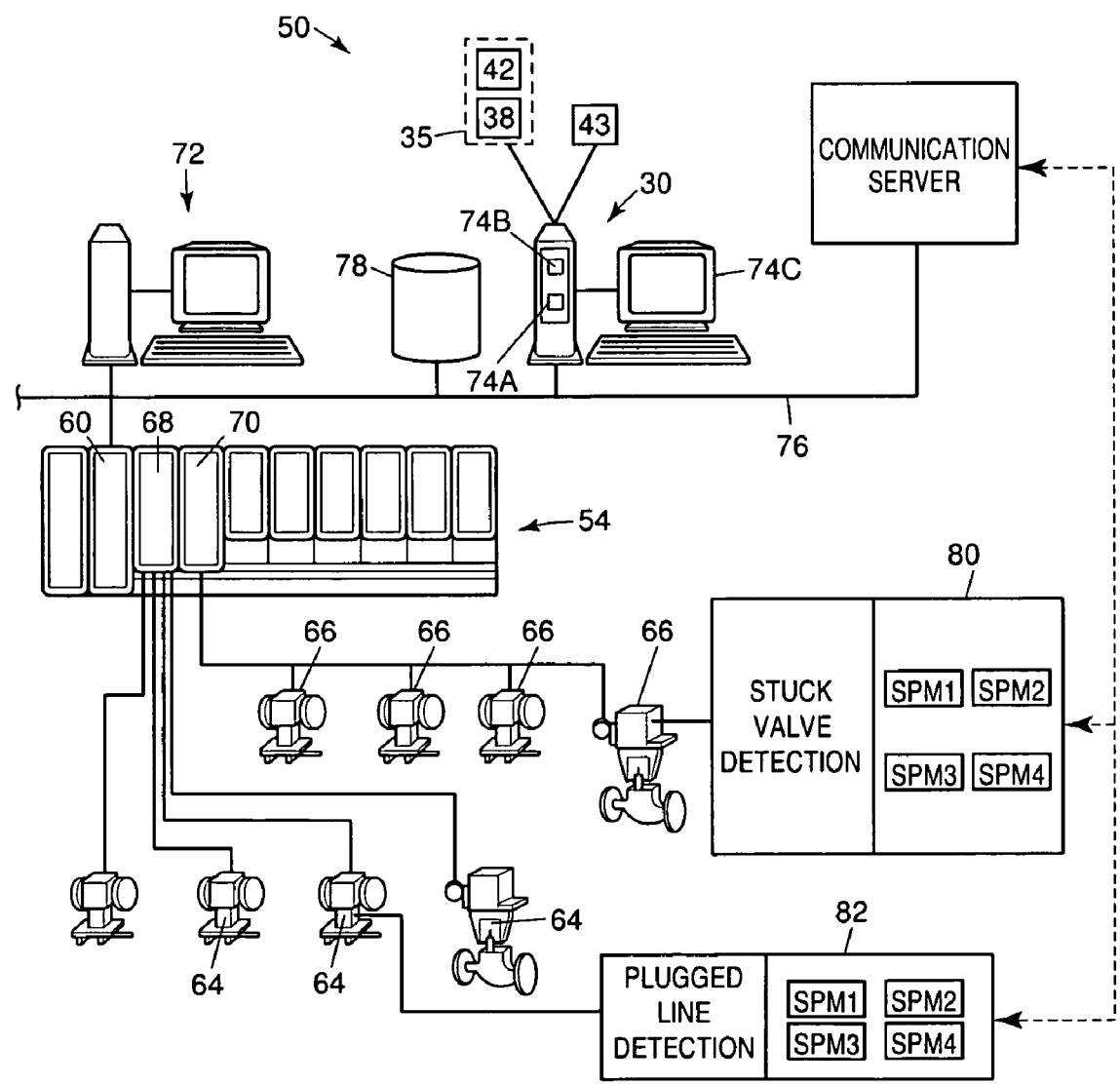
FIG. 2 is a block diagram of a portion of the process plant of FIG. 1, illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART and Fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve process variable data to determine if the valve is in a stuck condition. In addition, the block 80 may include a set of one or more statistical process monitoring (SPM) blocks or units such as blocks SPM1-SPM4 which may collect process variable or other data within the valve and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. The specific statistical data generated, nor the method in which it is generated is not critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known Foundation Fieldbus SPM blocks, or SPM blocks that have different or additional capabilities as compared with known Foundation Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol. If desired, the underlying operation of blocks 50 may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM block located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may includes one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Overview of an Abnormal Operation Detection (AOD) System

Figure 3:
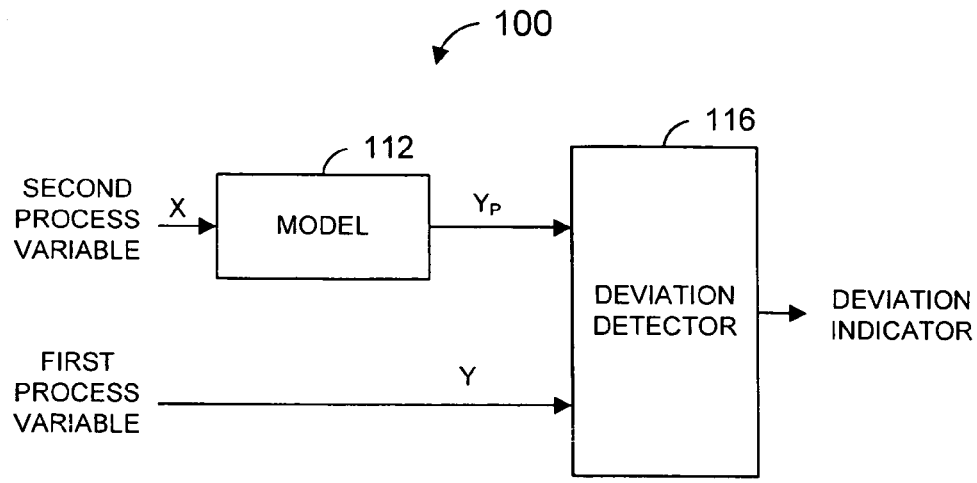
FIG. 3 is a block diagram of an example abnormal operation detection (AOD) system that may determine whether a process variable significantly deviates from a predicted value.

FIG. 3 is a block diagram of example abnormal operation detection (AOD) system 100 that could be utilized in the abnormal operation detection blocks 80 and 82 of FIG. 2. The AOD system 100 may include a model 112 and a deviation detector 116. Generally, the model 112 generates a predicted value $Y_p$ of a first process variable Y. The model 112 may comprise any of a variety of models suitable for use in a process plant such as a regression model, a high fidelity model, a neural network, a fuzzy logic-based model, etc. The model 112 may generate the predicted value $Y_p$ based on a second process variable X and zero or more additional process variables (not shown in FIG. 3). In one particular implementation, the model 112 may comprise a model as described in U.S. patent application Ser. No. 11/492,467, entitled "METHOD AND SYSTEM FOR DETECTING ABNORMAL OPERATION IN A PROCESS PLANT," filed on the same day as the present application, which is hereby incorporated by reference herein in its entirety. For example, the model 112 may comprise a model including multiple regression models corresponding to different regions of operation.

Generally, the deviation detector 116 receives the first process variable Y and the predicted value $Y_P$, and determines whether the first process variable Y significantly deviates from the predicted value $Y_P$ using a technique such as one of more of the techniques to be described below. If the deviation detector 116 determines that the first process variable Y significantly deviates from the predicted value $Y_P$, it may generate an indicator of significant deviation. The indicator of significant deviation may also be an indicator of abnormal operation.

Each of the first process variable Y, the second process variable X, and any other additional process variable that may be utilized by the AOD system 100 may be, for example, a process variable, a process variable that has been processed in some way, an output of an SPM block, etc. For instance, a process variable utilized by the AOD system 100 could be a measured process signal such as an output of a transmitter or some other field device. As another example, a process variable utilized by the AOD system 100 could be a measured process signal that has been filtered by a high pass filter, a low pass filter, a bandpass filter, etc. As yet another example, a process variable utilized by the AOD system 100 could be a measured process signal that has been trimmed to cap values of the signal to a maximum and/or minimum value. In still another example, a process variable utilized by the AOD system 100 could be an output of an SPM block, such as a mean signal, a standard deviation signal, etc. As a further example, a process variable utilized by the AOD system 100 could be some combination of the examples above. For instance, a process variable could be a mean signal or a standard deviation signal generated from a measured process signal that was filtered and/or trimmed. As still a further example, the process variable could be some mathematical combination of a plurality of process variables.

The AOD system 100 could be implemented wholly or partially in a field device. As just one example, the model 112 could be implemented in a field device 66 and the deviation detector 116 could be implemented in the controller 60 or some other device, such as a different field device. As another example, the model 112 could be implemented in the controller 60 and the deviation detector 116 could be implemented in a field device 66. As yet another example, the AOD system 100 could be implemented in a controller or in a field device interface module (e.g., the Rosemount 3420 device), or by both the controller and the field device interface module. In one particular implementation, the AOD system 100 could be implemented as a function block, such as a function block to be used in system that implements a Fieldbus protocol. Such a function block may or may not include one or more SPM blocks. In another implementation, the model 112 and the deviation detector 116 could be implemented as separate function blocks.

The AOD system 100 may be in communication with the abnormal situation prevention system 35 (FIGS. 1 and 2). For example, the AOD system 100 may be in communication with the configuration application 38 to permit a user to configure the AOD system 100. For instance, the model 112 and the deviation detector 116 may have user configurable parameters that may be modified via the configuration application 38.

Additionally, the AOD system 100 may provide information to the abnormal situation prevention system 35 and/or other systems in the process plant. For example, deviation indicators generated by the deviation detector 116 could be provided to the abnormal situation prevention system 35 and/or the alert/alarm application 43 to notify an operator of the abnormal condition. As just one example, deviation indicators generated by the deviation detector 116 may include alerts or alarms that may be sent to the alert/alarm application 43. As yet another example, the AOD system 100 may provide Y and/or $Y_P$ values to the abnormal situation prevention system 35 so that an operator can view the values, for instance, when a deviation has been detected.

Although the predicted value $Y_P$ is generated by a model in the example AOD system 100 of FIG. 3, in other implementations, the model may be omitted. For example, the predicted value $Y_P$ could be a value such as a desired value (e.g., a desired level in a reactor, a desired temperature, a desired pressure, etc.), a nominal value (e.g., a mean value calculated while the process is known or thought to be in a steady state), etc.

Detecting a Significant Deviation

Various example techniques that may be utilized by the deviation detector 116 to detect whether the first process variable Y significantly deviates from the predicted value $Y_P$ will now be described.

One example technique that may be utilized by the deviation detector 116 includes detecting a trend that the first process variable Y is moving away from the predicted value $Y_P$. Such a trend may indicate, for example, a deterioration or wear of equipment, deterioration of a control technique, etc., and may indicate an abnormal situation is has occurred, is occurring, or will likely occur.

Figure 4:
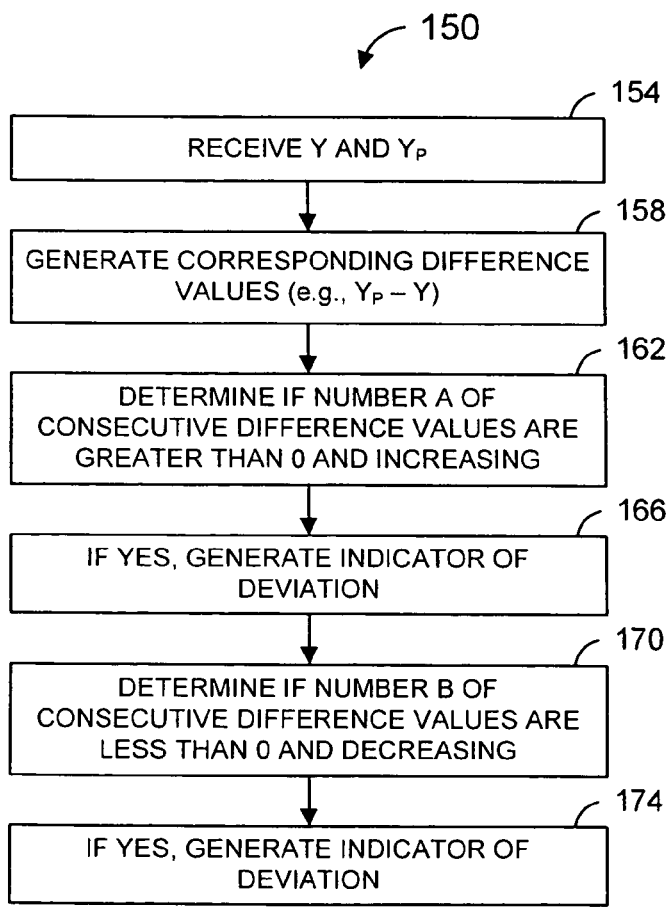
FIG. 4 is a flow diagram of an example method for detecting a trend that values of a process variable are moving away from corresponding predicted values.

FIG. 4 is a flow diagram of an example method for detecting a trend that the first process variable Y is moving away from the predicted value $Y_P$. At a block 154, values of the first process variable Y and corresponding values of the predicted value $Y_P$ may be received. At a block 158, corresponding difference values may be generated. For example, for each received value of Y, a corresponding value of the predicted value $Y_P$ may be used to generate a value $Y_P-Y$, or a value $Y-Y_P$.

At a block 162, it may be determined whether a number A of consecutive difference values is greater than 0 and is increasing. For instance, it may be determined whether $Z_k > Z_{k-1} > Z_{k-2} > \ldots > Z_{k-A-1} > 0$, where $Z_k$ is a difference value corresponding to the $k^{th}$ value of Y. Generally, the value of A may be a positive integer greater than 2, and an appropriate value may depend on the particular implementation and the particular process variable being monitored. For instance, a relatively small number A may be appropriate for some implementations and/or process variables, while a much larger value of A may be more appropriate for other implementations and/or process variables. If at the block 162 it is determined that the A consecutive difference values are greater than 0 and are increasing, an indicator of a significant deviation may be generated at a block 166.

At a block 170, it may be determined whether a number B of consecutive difference values is less than 0 and is decreasing. For instance, it may be determined whether $Z_k < Z_{k-1} < Z_{k-2} < \ldots < Z_{k-B-1} < 0$. If at the block 170 it is determined that the B consecutive difference values are less than 0 and are decreasing, an indicator of a significant deviation may be generated at a block 174. Similar to the number A, the value of B may be a positive integer greater than 2, and an appropriate value may depend on the particular implementation and the particular process variable being monitored. Typically, the number B may be the same as the number A, but may also be different. The values of A and/or B may be configured using the configuration application 38 (FIGS. 1, 2), for example. If A is to be the same as B, then both A and B can be configured by configuring only one of A or B, for example.

The indicators generated at the blocks 166 and 174 may optionally include an indicator of the direction of the trend. For example, the indicator generated at the block 166 may indicate a positive trend in the difference values, and the indicator generated at the block 166 may indicate a negative trend in the difference values.

One of ordinary skill in the art will recognize variations in the flow of FIG. 4. As just one example, at the block 162, instead of determining whether the difference values are greater than zero, it may be determined if the difference values are greater than some first non-zero threshold. Similarly, at the block 170, instead of determining whether the difference values are less than zero, it may be determined if the difference values are less than some second non-zero threshold. In one implementation, the first non-zero threshold and the second non-zero threshold may have the same magnitude, but in other implementations, the magnitudes may be different.

Figure 5:
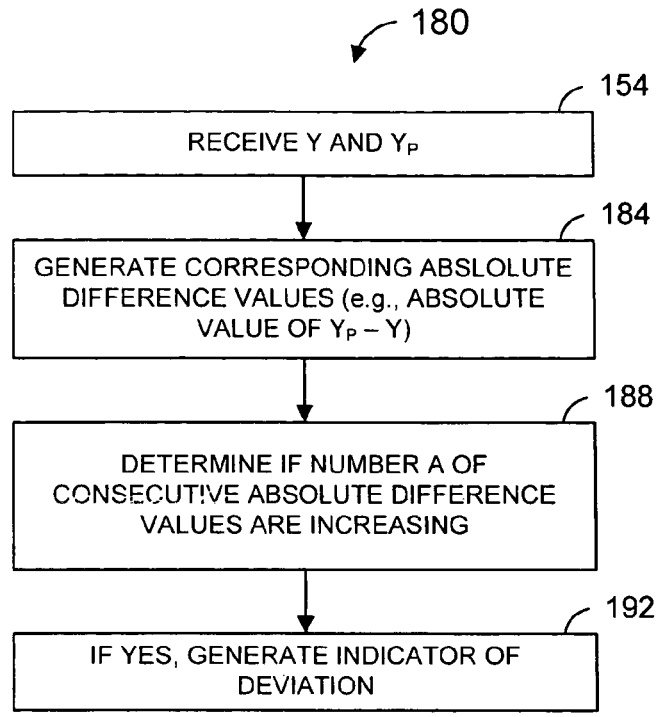
FIG. 5 is a flow diagram of another example method for detecting a trend that values of a process variable are moving away from corresponding predicted values.

FIG. 5 is a flow diagram of another specific example of a variation of the method 150 of FIG. 4. In a method 180, after receiving values of the first process variable Y and corresponding values of the predicted value $Y_P$ at the block 154, corresponding absolute difference values may be generated at a block 184. For example, for each received value of Y, an absolute value of the difference between Y and a corresponding value of the predicted value $Y_P$ may be generated.

At a block 188, it may be determined whether a number A of consecutive absolute difference values is increasing. For instance, it may be determined whether $Z_k > Z_{k-1} > Z_{k-2} > \ldots > Z_{k-A-1}$, where $Z_k$ is an absolute difference value (e.g., an absolute value of a difference between Y and a corresponding $Y_P$) corresponding to the $k^{th}$ value of Y. The value of A may be selected as described above with respect to FIG. 4. If at the block 188 it is determined that the A consecutive absolute difference values are increasing, an indicator of a significant deviation may be generated at a block 192.

In yet another implementation, it may be determined whether, within a set of A difference values $Z_{k-1}$, $Z_{k-2}$, $Z_{k-3}$, ..., $Z_{k-A-1}$, some subset of B difference values, where B<A, are increasing, increasing beyond some threshold, decreasing, decreasing beyond some threshold, etc. For example, it may be determined whether there is some subset of difference values $Z_{k1}$, $Z_{k2}$, $Z_{k3}$, ..., $Z_{kB}$, where k1>k2> k3> ... >kB, and where $Z_{k1} > Z_{k2} > Z_{k3} > \ldots > Z_{kB}$. In still another implementation, a trend may be detected by analyzing rate of change (ROC) information, first derivative information, second derivative information, etc. For instance, if a particular number of consecutive ROC values, or if at least a minimum number of ROC values in a set of ROC values were above some threshold, this may indicate a positive trend. As another example, a line could be fit to a certain number of difference values, and its slope could be analyzed to determine if it exceeds some threshold.

Additionally, different techniques such as the techniques described above could be combined. For example, determining whether there is a trend could comprise determining if there are certain number of consecutively increasing values, and also determining whether the slope of a line that best fits the values exceeds a threshold. As another example, it may be determined within a set of A difference values there is some subset of B difference values $Z_{k1}$, $Z_{k2}$, $Z_{k3}$, ..., $Z_{kB}$, where B<A, where k1>k2>k3> ... >kB, where $Z_{k1} > Z_{k2} > Z_{k3} > \ldots > Z_{kB}$; in addition, a trend may be indicated if at least some of the ROC values corresponding to these difference values exceed some threshold. One of ordinary skill in the art will recognize many other variations.

Detecting Cycling

Another example technique that may be utilized by the deviation detector 116 includes detecting a cycling of the first process variable Y about the predicted value $Y_P$. Such cycling may indicate, for example, temperature changes or other recurring changes in the environment, differences between operators and/or operator techniques, regular rotation of machines, a poorly tuned control loop, etc., and may indicate an abnormal situation has occurred, is occurring, or will likely occur. In some applications, if the first process variable Y is cycling about the predicted value $Y_P$, but the magnitude of the difference between Y and $Y_P$ is not relatively large, Y may nevertheless be considered as significantly deviating from $Y_P$.

Figure 6:
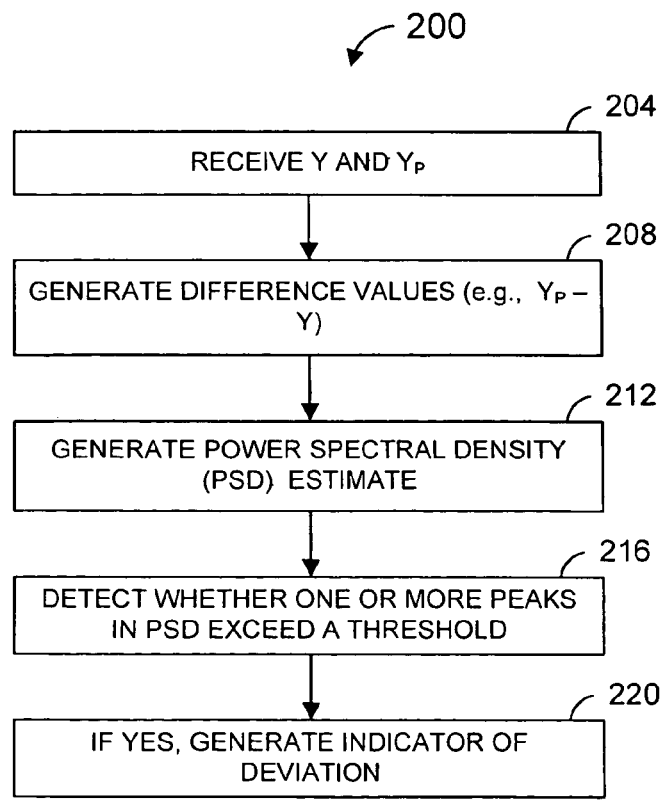
FIG. 6 is a flow diagram of an example method for detecting cycling of a process variable.

FIG. 6 is a flow diagram of an example method 200 for detecting cycling. At a block 204, values of the first process variable Y and corresponding values of the predicted value $Y_P$ may be received. At a block 208, corresponding difference values may be generated. For example, for each received value of Y, a corresponding value of the predicted value $Y_P$ may be used to generate a value $Y_P$–Y, or a value Y–$Y_P$.

At a block 212, estimates of the power spectral density (PSD) of the difference values may be generated. Any number of techniques, including known techniques, may be used to generate the estimates of PSD. For example, nonparametric estimators such as periodogram estimators, Blackman-Tukey estimators, minimum variance estimators, etc., may be utilized. As another example, parametric estimators such as those based on time series models may be utilized. As yet another example, a plurality of band-pass filters tuned to respective frequencies could be utilized.

Then, at a block 216, it may be determined whether any peaks in the estimated PSD exceed a threshold. The threshold may be chosen in a variety of ways. For example, the threshold may be based on an average PSD of the difference signal. For instance, the threshold could be chosen to be some percentage of the average PSD. The threshold percentage could be selected based on the particular application. As another example, the threshold may be based on the magnitude of the PSD at one or more other frequencies and/or one or more other peaks. For instance, the threshold could be chosen to be some percentage of the next highest peak, some percentage of the lowest peak, etc. Additionally, the threshold could be chosen based on a maximum PSD value. In determining whether any peaks exceed a threshold, the PSD at zero frequency (and optionally other frequencies near zero) may be ignored and/or the difference values (e.g., $Y_P$–Y or Y–$Y_P$) may be processed to remove a DC component prior to generating the PSD estimates. Other factors optionally may be utilized to determine whether any peaks exist in the estimated PSD. As just one example, the peaks first may be identified based on analyzing the widths of potential peaks. For instance, a feature in the PSD that is spread relatively widely over several frequencies may not be considered a peak. Parameters, such as thresholds, for detecting whether peaks exist in the estimated PSD, may be configurable using the configuration application 38, for example.

Figure 7:
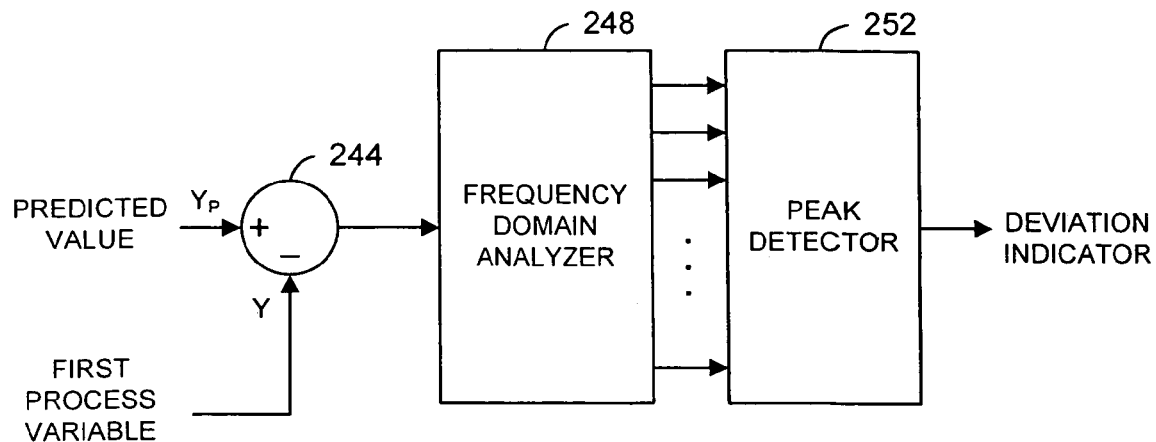
FIG. 7 is a block diagram of an example cycling detection system.

The deviation detector 116 may comprise a cycling detection system that implements the method 200 of FIG. 6 or some other cycling detection method. FIG. 7 is a block diagram of an example cycling detection system 240 that the deviation detector 116 may include. The cycling detection system 240 may comprise a difference generator 244, a frequency domain analyzer 248, and a peak detector 252. The difference generator 244 may receive the first process variable Y and the predicted value $Y_P$ and generate a difference signal (e.g., Y–$Y_P$). Referring to FIG. 6, the difference generator 244 may implement the blocks 204 and 208, for example.

The difference signal may be provided to the frequency domain analyzer 248, which generates a plurality of signals indicative of the spectral content of the difference signal at different frequencies. The signals generated by the frequency domain analyzer 248 may be provided to a peak detector 252. The peak detector 252 generally may operate to detect energy peaks and to determine if one or more of any detected peaks exceeds a threshold. Additionally, the peak detector 252 may, if it determines that one or more peaks have exceeded the threshold, generate an indicator of a significant deviation. Referring to FIG. 6, the peak detector 252 may implement the blocks 216 and 220, for example.

In one implementation, the frequency domain analyzer 248 may comprise a power spectral density (PSD) generator that generates a plurality of PSD estimates corresponding to different frequencies. The plurality of PSD estimates may or may not include a PSD estimate corresponding to frequency zero. Optionally, the PSD estimate generator may generate additional information as well such as an average PSD. The PSD estimate generator may comprise any of a variety of PSD estimators, including known PSD estimators such as those described with respect to FIG. 6. Referring to FIG. 6, the PSD estimate generator 248 may implement the block 212, for example.

In this implementation, the plurality of PSD estimates, and optionally other information generated by the PSD estimate generator 248 such as the average PSD, may be provided to a peak detector 252. The peak detector 252 generally may operate to detect PSD peaks and to determine if one or more of any detected peaks exceeds a threshold.

The PSD generator may be implemented using a variety of techniques. Optionally, the frequency domain analyzer 248 may comprise a Fourier transform generator such as a fast Fourier transform (FFT) generator. The frequency domain analyzer 248 could also comprise an envelope generator that smoothes the generated Fourier transform or that fits a spectral envelope to the Fourier transform using any of a variety of techniques, such as known techniques like linear predictive coding, cepstrum, discrete cepstrum, utilizing a non-linear frequency scale, etc.

In yet another implementation, the frequency domain analyzer 248 may comprise a plurality of bandpass filters tuned to different frequencies.

Many variations to the example cycling detection system 240 will become apparent to those of ordinary skill in the art. As just one example, a signal processing device may be utilized between the difference generator 244 and the frequency domain analyzer 248, the signal processing device configured to remove or reduce a DC component from the difference signal. Such a signal processing device could comprise, for instance, a subtractor that subtracts a mean value from the difference signal, a high pass filter, etc.

Statistical-Based Thresholds

Yet another example technique that may be utilized by the deviation detector 116 includes comparing the first process variable Y to the predicted value $Y_P$ and to one or more thresholds generated based on statistical data computed by one or more SPM blocks. As described previously, SPM blocks may generate statistical information regarding process variables analyzed by the SPM blocks. Such statistical information may comprise, for example, means, standard deviations, variances, rates of change, range, etc., and such statistical information may be used to generate thresholds. Additionally, SPM blocks may store nominal values of statistical data. Such nominal values may be computed by the SPM blocks (i.e., during a normal operation of the process), programmed into the SPM blocks during manufacture and/or during operation of the process, etc. Of course, some block or device different from the SPM block could receive statistical data from the SPM block, generate nominal values of the statistical data, and then store the nominal value in a block or device different from the SPM block. Utilizing thresholds generated based on statistical data received from an SPM block may optionally eliminate the need for thresholds to be set by an operator, thus reducing the amount of operator configuration needed to use the system.

As just one example, a standard deviation $\sigma$ may be used to generate one or more thresholds. For instance, one or more of the following thresholds could be generated: $\sigma$ above a predicted value, $\sigma$ below the predicted value, $2\sigma$ above the predicted value, $2\sigma$ below the predicted value, $3\sigma$ above the predicted value, $3\sigma$ below the predicted value, etc. In some implementations, the standard deviation $\sigma$ may be received from a SPM block that monitors the first process variable Y, for example. The standard deviation $\sigma$ received from the SPM block could be a nominal standard deviation stored in the SPM block or in another block or device. In other implementations (e.g., in implementations in which a standard deviation $\sigma$ of a first process variable is known to vary based on the first process variable and/or at least a second process variable), the standard deviation $\sigma$ generated by the SPM block could be used to train a model of the standard deviation $\sigma$. As just one specific example, the model could model the standard deviation $\sigma$ of the first process variable as a function of the mean of the first process variable or the mean of a second process variable. Such a model may comprise any of a variety of models suitable for use in a process plant such as a regression model, a high fidelity model, a neural network, a fuzzy logic-based model, etc. In one particular implementation, a model may be utilized such as described in U.S. patent application Ser. No. 11/492,467, entitled "METHOD AND SYSTEM FOR DETECTING ABNORMAL OPERATION IN A PROCESS PLANT," filed on same day as the present application. For example, the model may include multiple regression models corresponding to different regions of operation.

Figure 8:
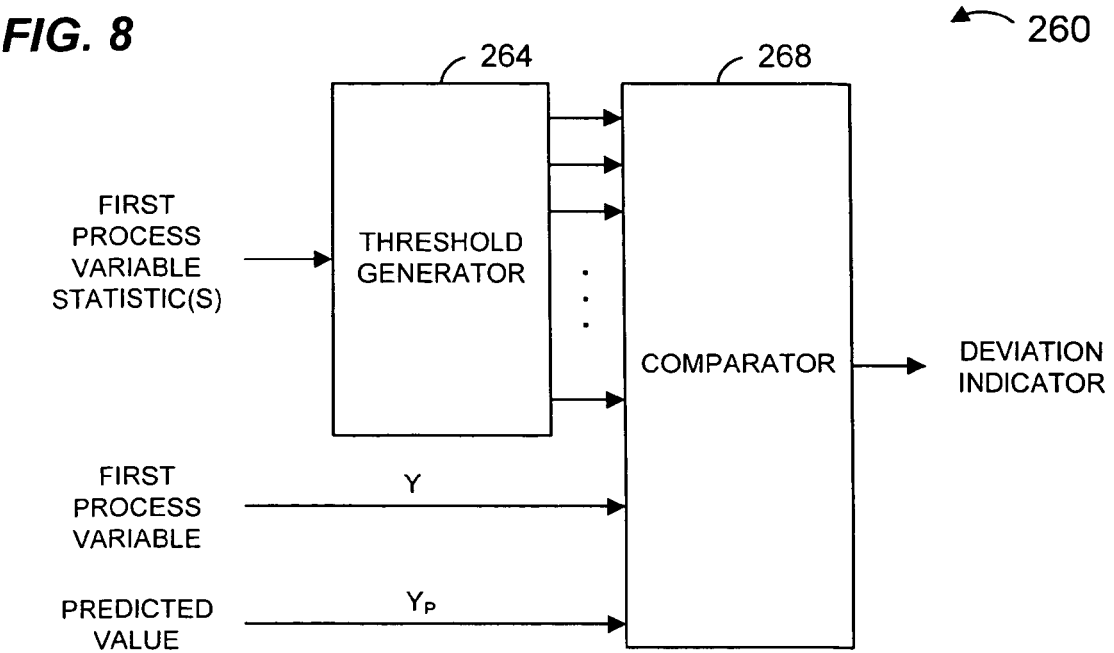
FIG. 8 is a block diagram of an example threshold system that may determine whether a process variable significantly deviates from a predicted value based on one or more thresholds.

FIG. 8 is a block diagram of an example threshold system 260 that the deviation detector 116 (FIG. 3) may include. The threshold system 260 may comprise a threshold generator 264 and a comparator 268. The threshold generator 264 may receive one or more statistics of the first process variable, and generate one or more thresholds based on the received statistics. As just one specific example, the threshold generator 264 may receive a standard deviation $\sigma$ and may generate one or more of the following thresholds: a $+\sigma$ threshold, a $-\sigma$ threshold, a $+2\sigma$ threshold, a $-2\sigma$ threshold, a $+3\sigma$ threshold, a $-3\sigma$ threshold, etc. As described above, the one or more statistics may be received from an SPM block or a model, for example.

In some implementations, the threshold generator 264 may be omitted. For example, if only a $+\sigma$ threshold is desired, a received standard deviation $\sigma$ may be used as the threshold.

The comparator 268 receives the thresholds generated by the threshold generator 264, and also receives the first process variable Y and the predicted value $Y_P$. Generally, the comparator 268 determines whether values of Y fall within one or more regions defined by the predicted value $Y_P$ and the thresholds received from the threshold generator 264. More specifically, for a given threshold $+M$, the comparator 268 determines whether values of Y fall within the region $Y>Y_P+M$. As another specific example, if $+3\sigma$ and $-3\sigma$ thresholds are utilized, the comparator 268 may determine whether values of Y fall within the region $Y>Y_P+3\sigma$, and whether values of Y fall within the region $Y<Y_P-3\sigma$. As another example, the comparator 268 may determine whether values of Y fall within a region $Y>Y_P$, and may determiner whether values of Y fall within a region $Y<Y_P$.

The comparator 268 may also determine whether a particular number of consecutive values of Y fall within a region defined by the predicted value $Y_P$ and the thresholds received from the threshold generator 264. As a specific example, if $+2\sigma$ $-2\sigma$ thresholds are utilized, the comparator 268 may determine whether a number A of consecutive values of Y fall within the region $Y>Y_P+2\sigma$, and whether a number B of consecutive values of Y fall within the region $Y<Y_P-2\sigma$. The number A may be the same as the number B, or the numbers A and B may be different. Optionally, the numbers A and/or B may be configurable. For example, an operator may be able to configure the numbers A and B separately, or the operator may be able to configure the number A, but the number B is constrained to equal the number B.

As just one example, a standard deviation a may be used to generate one or more thresholds. For instance, one or more of the following thresholds could be generated: $+\sigma$, $-\sigma$, $+2\sigma$, $-2\sigma$, $+3\sigma$, $-3\sigma$, etc. In one specific example, the following thresholds are generated: $+\sigma$, $-\sigma$, $+2\sigma$, $-2\sigma$, $+3\sigma$, $-3\sigma$. In another specific example, the following thresholds are generated: $+\sigma$, $-\sigma$, $+2\sigma$, $-2\sigma$. In yet another specific example, the following thresholds are generated: $+\sigma$, $-\sigma$, $+3\sigma$, $-3\sigma$. In yet another specific example, the following thresholds are generated: $+2\sigma$, $-2\sigma$, $+3\sigma$, $-3\sigma$. In still other specific examples, $+\sigma$ and $-\sigma$ are generated, $+2\sigma$ and $-2\sigma$ are generated, or $+3\sigma$ and $-3\sigma$ are generated.

In the example in which one or more of $+\sigma$, $-\sigma$, $+2\sigma$, $-2\sigma$, $+3\sigma$, $-3\sigma$, etc., thresholds are generated, the comparator 268 may also determine whether values of Y fall within one or more of the following regions: $Y>Y_P$, $Y<Y_P$, $Y>Y_P+\sigma$, $Y<Y_{P-\sigma}$, $Y>Y_P+2\sigma$, $Y<Y_P-2\sigma$, $Y>Y_P+3\sigma$, $Y<Y_P-3\sigma$, etc. In this example, the comparator 268 may further determine whether certain consecutive numbers of values of Y fall within the one or more regions. As a specific example, the comparator 268 may determine whether a number C of consecutive values fall within the region $Y>Y_P$, and whether C consecutive values fall within the region $Y<Y_P$. As another example, the comparator 268 may determine whether a number D of consecutive values fall within the region $Y>Y_P+\sigma$, and whether D consecutive values fall within the region $Y<Y_P-\sigma$. Similarly, the comparator 268 may determine whether a number E of consecutive values fall within the region $Y>Y_P+2\sigma$, and whether E consecutive values fall within the region $Y<Y_P-2\sigma$. Also, the comparator 268 may determine whether a number F of consecutive values fall within the region $Y>Y_P+3\sigma$, and whether F consecutive values fall within the region $Y<Y_P-3\sigma$. Table 1 provides example values of the numbers C, D, E and F that may be utilized. Of course different values could also be used. For example, the number C could be chosen as something other than 8, such as 5, 6, 7, 9, 10, 11, 12, etc. Similarly, values of D, E, and F other than those in Table 1 could be utilized.

If the comparator 268 determines that one or more consecutive values of Y fall within a particular region, it may then generate an indicator of a significant deviation. For instance, in the example in which the comparator 268 determines whether E consecutive values of Y fall within the region $Y>Y_P+2\sigma$, and if it determines that E consecutive values of Y fall within the region $Y>Y_P+2\sigma$, then the comparator 268 may generate an indicator of a significant deviation. As another example, if the comparator 268 is configured to determine whether F consecutive values of Y fall within the region $Y<Y_P-3\sigma$, and if it determines that F consecutive values of Y fall within the region $Y<Y_P-3\sigma$, then the comparator 268 may generate an indicator of a significant deviation.

To configure a system such as the system 260, an operator may be permitted to select regions and respective numbers of consecutive values of the first process variable Y that must fall within that region in order to indicate a significant deviation. One way in which the operator may select regions is to permit the operator to select statistical-based thresholds. In one particular example, the operator is permitted to select a plurality of pairs of values $[m_1, n_1]$, $[m_2, n_2]$, $[m_3, n_3]$, $[m_4, n_4]$, ..., where $m_1, m_2, m_3, \ldots$, are real numbers indicative of statistical-based thresholds and $n_1, n_2, n_3, \ldots$, are integers specifying corresponding consecutive numbers of values of Y in the corresponding regions that indicate a significant deviation. For instance, the operator may select $m_1=3$ and $n_1=1$ to indicate thresholds of $+3\sigma$ and $-3\sigma$, and to indicate that only one value of Y need exceed the threshold in order to generate a significant deviation indicator. In other words, selecting $m_1=3$ and $n_1=1$ would configure the system 260 to generate a significant deviation indicator if one or more values of Y fall in the region $Y<Y_P-3\sigma$ or in the region $Y>Y_P+3\sigma$. Alternatively, the selection of $m_1=3$ and $n_1=1$ may indicate a threshold of $+3\sigma$, and indicate that only one value of Y need exceed the threshold in order to generate a significant deviation indicator. In other words, selecting $m_1=3$ and $n_1=1$ would configure the system 260 to generate a significant deviation indicator if one or more values of Y fall in the region $Y>Y_P+3\sigma$.

TABLE 1

| Number | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| C | 8 | 8 | 8 | 8 | 8 | 8 | 8 | 8 | 8 | 8 | 8 | 8 |
| D | 3 | 4 | 5 | 4 | 5 | 4 | 5 | 5 | 6 | 7 | 5 | 6 |
| E | 2 | 2 | 2 | 3 | 3 | 3 | 3 | 4 | 4 | 4 | 4 | 5 |
| F | 1 | 1 | 1 | 1 | 1 | 2 | 2 | 2 | 2 | 2 | 3 | 3 |

Generally, selection of appropriate numbers may depend on the specific implementation, the specific process being monitored, etc., and the numbers typically will be chosen so that $C>D>E>F$. Further, different numbers for positive and negative thresholds could be used. As just one example, the comparator 268 may determine whether a number D1 of consecutive values fall within the region $Y>Y_P+\sigma$, and whether a number D2 consecutive values fall within the region $Y<Y_P-\sigma$, where D1 and D2 could be different numbers.

In one variation, the comparator 268 may determine whether C consecutive values fall within the region $Y>Y_P$, $Y<Y_P$, whether D consecutive values fall within the region $Y>Y_P+\sigma$, $Y<Y_P-\sigma$, whether E consecutive values fall within the region $Y>Y_P+2\sigma$, $Y<Y_P-2\sigma$, and whether F consecutive values fall within the region $Y>Y_P+3\sigma$, $Y<Y_P-3\sigma$.

In this implementation, the operator would need to select $m_2=-3$ and $n_2=1$ to configure the system 260 to generate a significant deviation indicator if one or more values of Y fall in the region $Y<Y_P-3\sigma$.

As another example, if the operator selects a value of $m_1=0$ and $n_1=8$, this could configure the system 260 to generate a significant deviation indicator if eight consecutive values of Y fall in the region $Y<Y_P$ or if eight consecutive values of Y fall in the region $Y>Y_P$. As still another example, the operator may select $m_1=2.5$ and $n_1=2$ to indicate thresholds of $+2.5\sigma$ and $-2.5\sigma$, and to indicate that two consecutive values of Y need must exceed the threshold in order to generate a significant deviation indicator. In other words, selecting $m_1=2.5$ and $n_1=2$ would configure the system 260 to generate a significant deviation indicator if two consecutive values of Y fall in the region $Y<Y_P-2.5\sigma$ or if two consecutive values fall in the region $Y>Y_P+2.5\sigma$. Alternatively, the selection of $m_1=2.5$ and $n_1=2$ may indicate a threshold of $+2.5\sigma$, and indicate that only two consecutive values of Y must exceed the threshold in order to generate a significant deviation indicator. In other words, selecting $m_1=2.5$ and $n_1=2$ would configure the system 260 to generate a significant deviation indicator if two consecutive values of Y fall in the region $Y>Y_P+2.5\sigma$. In this implementation, the operator would need to select $m_2=-2.5$ and $n_2=2$ to configure the system 260 to generate a significant deviation indicator if two consecutive values of Y fall in the region $Y<Y_P-2.5\sigma$.

As yet another example, if the operator would like to select the thresholds $-3\sigma$ and $+3\sigma$, with only one value in each region to cause generation of a significant deviation, the thresholds $-2\sigma$ and $+2\sigma$, with two consecutive values exceeding $Y_P+2\sigma$ or two consecutive values less than $Y_P-2\sigma$ needed to cause generation of a significant deviation, the thresholds $-\sigma$ and $+\sigma$, with four consecutive values exceeding $Y_P+\sigma$ or four consecutive values less than $Y_P-\sigma$ needed to cause generation of a significant deviation, and eight consecutive values exceeding $Y_P$ or eight consecutive values less than $Y_P$ needed to cause generation of a significant deviation, the operator could select the following: $[m_1=3, n_1=1]$, $[m_2=2, n_2=2]$, $[m_3=1, n_3=4]$, and $[m_4=0, n_4=8]$.

In at least some of the examples described above, the system 260 may generate a significant deviation indicator if a specified number of consecutive values fall within a region. In other implementations, the system 260 may generate a significant deviation indicator if each value of a specified number of consecutive values falls within one of a plurality of regions. As just one example, the system 260 may generate a significant deviation indicator if each value of N consecutive values of Y fall in either of the regions $Y<Y_P-2\sigma$ or $Y>Y_P+2\sigma$, where N is some positive integer.

Although the above-described examples involved standard deviation-based thresholds and regions, the thresholds/regions could be based on other statistics such as mean, variance, range, etc. Additionally, the type of statistics used could be configurable by the operator. The statistic to be used could selected for each region/threshold, for a pair of regions/thresholds (e.g., $Y<Y_P-3\sigma$ and $Y>Y_P+3\sigma$), or for all of the regions/thresholds.

Although the above-described examples involved determining whether a consecutive number of values fall within a region, other implementations may determine whether some number of values, which may be non-consecutive, fall within the region. For example, it may be determined whether at least a first number of values, out of a second number of consecutive values, are within the region, where the second number is greater than the first number.

Parameters, such as the pairs of values $[m_1, n_1]$, $[m_2, n_2]$, $[m_3, n_3]$, $[m_4, n_4]$, utilized by the system 260 may be configurable using the configuration application 38, for example.

Sequential Testing

Figure 9:
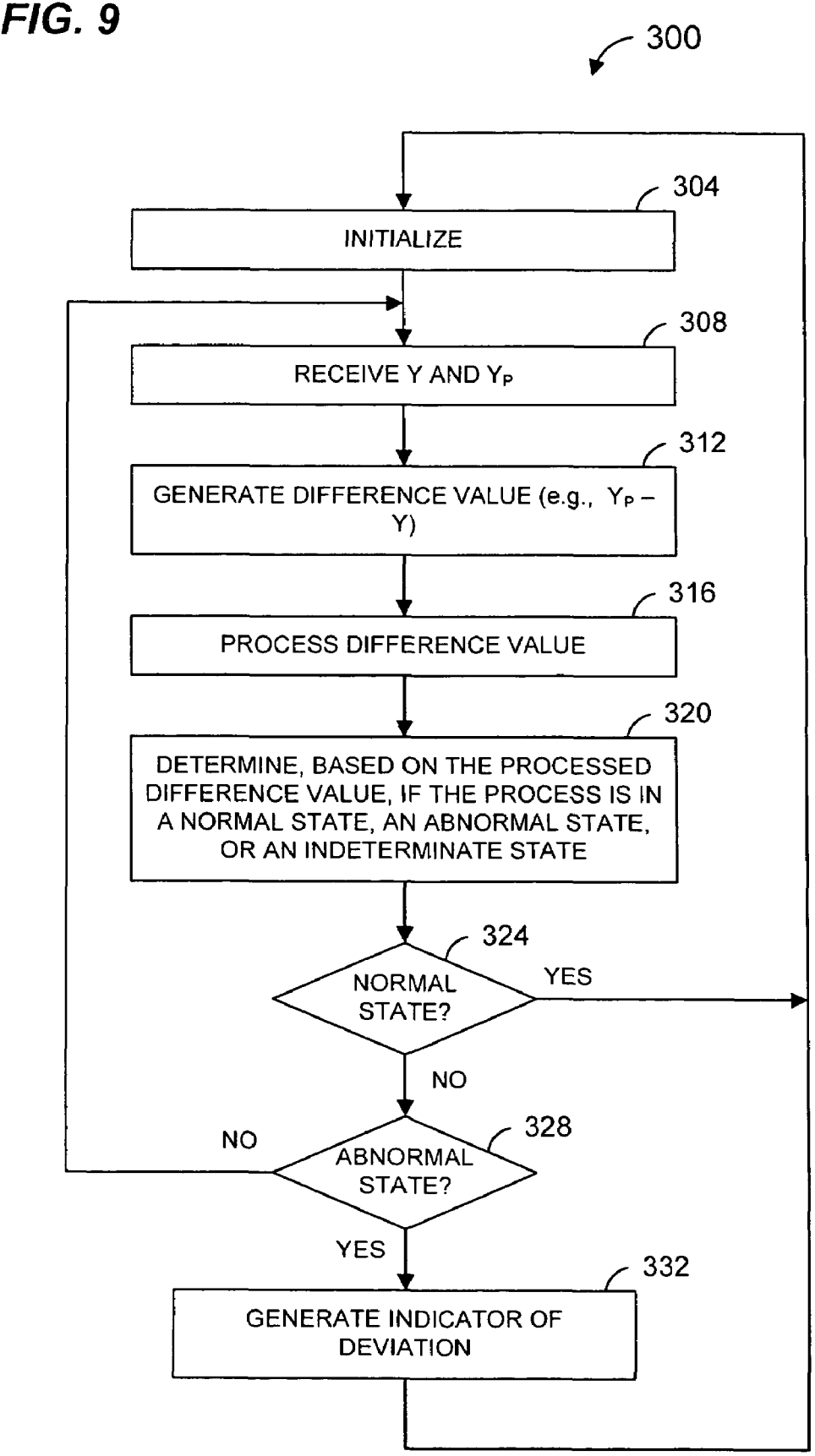
FIG. 9 is a flow diagram of an example method for determining whether a process variable significantly deviates from a predicted value.

Still another example technique that may be utilized by the deviation detector 116 (FIG. 3) generally includes making determinations that that the process is in one of several states. The several states may include a normal state, at least one abnormal state, and at least one indeterminate state. FIG. 9 is a flow diagram of an example method 300 for determining whether a process variable Y significantly deviates, in a positive direction, from a predicted value $Y_P$. A similar method can be utilized to determine whether Y significantly deviates, in a negative direction, from $Y_P$. Also, the method 300 can be modified to determine whether Y significantly deviates, in either direction, from $Y_P$.

Generally speaking, the flow 300 may be implemented for each value of Y that is received by the deviation detector 116.

The flow may begin at a block 304, at which one or more variables that are to be used in the method 300 may be initialized. At a block 308, a value of Y and a value of $Y_P$ may be received. Then, at a block 312, a difference value may be generated. For example, a value $Y_P-Y$ or a value $Y-Y_P$ may be generated.

At a block 316, the difference value may be processed to facilitate a determination of whether the process is in a normal state or an abnormal state. For instance, the difference value may be mathematically combined with zero, one or more previously processed difference values. A specific example of a technique for processing the difference value will be described subsequently. At a block 320, the processed difference value may be analyzed to determine whether the process is in a normal state, an abnormal state, or an indeterminate state. This may comprise comparing the processed difference value to one or more thresholds. Examples of thresholds that may be utilized will be described subsequently.

At a block 324, if it is determined that the process is in a normal state, the flow may proceed back to the block 304. Otherwise the flow may proceed to a block 328. If the flow proceeds back to the block 304, a variable that stores information related to previously processed difference values may be cleared, for example.

At the block 328, if it is determined that the process is in an abnormal state, the flow may proceed to a block 332. Otherwise, if it is determined that the process is in an indeterminate state, the flow may proceed back to the block 308 to receive the next Y and $Y_P$ values. At the block 332, an indicator of an abnormal condition may be generated. Alternatively, an indicator of an abnormal condition may be generated if it is determined that the process is in an abnormal state some particular number of consecutive times. As yet another example, the indicator may be generated if it is determined that the process is in an abnormal state some particular number of times during some particular length of time.

Figure 10:
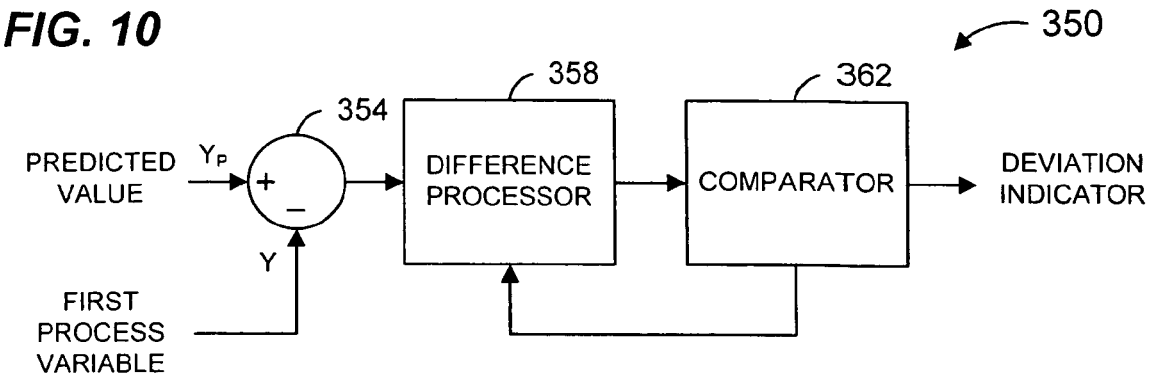
FIG. 10 is a block diagram of an example system for determining whether a process variable significantly deviates from a predicted value.

FIG. 10 is a block diagram of one example system 350 that may be utilized to implement the method 300 of FIG. 9, and will be describe with reference to FIG. 9. Of course, other systems could also implement the method 300. Similarly, the system 350 may implemented other methods besides the method 300. The deviation detector 116 (FIG. 3) may include the system 350.

The system 350 may include a difference generator 354, a difference processor 358, and a comparator 362. The difference generator 354 may receive the first process variable Y and the predicted value $Y_p$ and generate a difference signal (e.g., $Y-Y_p$). Referring to FIG. 9, the difference generator 354 may implement the blocks 308 and 312, for example.

The difference signal may be provided to the difference processor 358. The difference processor 358 generally processes the difference values to facilitate a determination of whether the process is in a normal state or an abnormal state. For instance, the difference processor 358 may mathematically combine a current difference value with zero, one or more previously processed difference values. Additionally, the difference processor 358 may receive a signal from the comparator 362 that indicates whether one or more variables utilized by the difference processor 358 should be cleared. The difference processor 358 may implement the blocks 304 and 316, for example.

The comparator 362 receives the processed difference values from the difference processor 358, analyzes the processed difference values, and determines whether the process is in a normal state, an abnormal state, or an indeterminate state. This may comprise comparing the processed difference value to one or more thresholds. Examples of thresholds that may be utilized with be described subsequently. For example, a received processed difference value may be analyzed to determine whether it is less than a threshold A or if it is greater than a threshold B. If it is less than the threshold A, this may indicate that the process is in a normal state. If the received processed difference value is less than the threshold A, the comparator 362 may signal the difference processor 358 to clear the one or more variables it utilizes.

If the comparator 362 determines that the received processed difference value is greater than the threshold B, this may indicate that the process is in an abnormal state. Thus, the comparator 362 may generate a significant deviation indicator. Additionally, the comparator 362 may signal the difference processor 358 to clear the one or more variables it utilizes.

If the comparator 362 determines that the received processed difference value is greater than or equal to the threshold A and is less than or equal to the threshold B, this may indicate that the process is in an indeterminate state.

The comparator 362 may implement the blocks 320, 324, 328 and 332.

Figure 11:
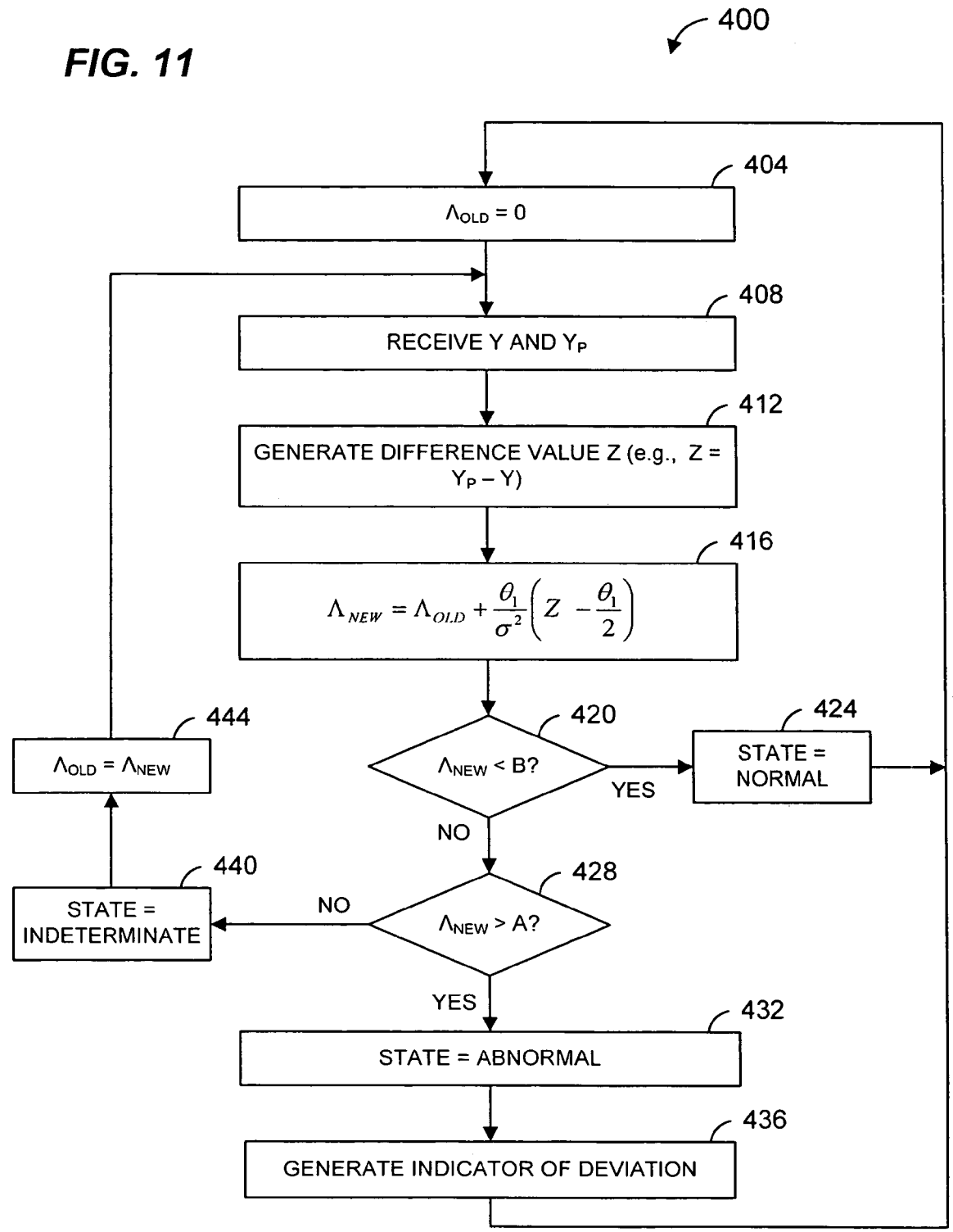
FIG. 11 is a flow diagram of another example method for determining whether a process variable significantly deviates, in a positive direction, from a predicted value.

FIG. 11 is a flow diagram of an example method 400 that may be utilized to implement the method 300 of FIG. 9. Generally speaking, the flow 400 may be implemented for each value of Y that is received by the deviation detector 116. The flow may begin at a block 404, at which a variable $\Lambda_{OLD}$ may be initialized to zero. At a block 408, a value of Y and a value of $Y_P$ may be received. Then, at a block 412, a difference value Z may be generated. For example, a value $Z=Y_P-Y$ or $Z=Y-Y_P$ may be generated.

At a block 416, the difference value generated at the block 412 is processed to generate a value $\Lambda_{NEW}$ according to the equation:

$$\Lambda_{NEW} = \Lambda_{OLD} + \frac{\theta_1}{\sigma^2}\left(Z - \frac{\theta_1}{2}\right) \quad \text{(Equ. 1)}$$

where $\sigma^2$ is a variance of Z and $\theta_1$ is a parameter that will be described in more detail subsequently.

The variance $\sigma^2$ can be determined ahead of time by, for example, calculating it based on a plurality of values of Y and $Y_P$. For example, if a plurality of values $Y_i$, for i=1 to n, are used to train a model of Y, the variance of Z can be calculated as:

$$\sigma^2 = \frac{\sum_{i=1}^{n}(Y_{P,i} - Y_i)^2}{n-1} \quad \text{(Equ. 2)}$$

where $Y_{P,i}$ is the predicted value, generated by the model, of $Y_i$. As another example, a plurality of values $Y_i$, and $Y_{P,i}$, for i=1 to n, could be collected during a time period in which the process is known or thought to be stable.

In other implementations (e.g., in implementations in which a variance $\sigma^2$ of a first process variable Y is known to vary based on the first process variable Y and/or at least a second process variable X), the variance $\sigma^2$ could be modeled as a function of Y or a second process variable X, for example. As just one specific example, a model could model the variance $\sigma^2$ of Z as a function of the mean of the first process variable Y or the mean of a second process variable X. Such a model may comprise any of a variety of models suitable for use in a process plant such as a regression model, a high fidelity model, a neural network, a fuzzy logic-based model, etc. In one particular implementation, a model may be utilized such as described in U.S. patent application Ser. No. 11/422,467, entitled "METHOD AND SYSTEM FOR DETECTING ABNORMAL OPERATION IN A PROCESS PLANT," filed on the same day as the present application. For example, the model may include multiple regression models corresponding to different regions of operation.

With regard to the parameter $\theta_1$, generally, as this parameter is made larger, the method becomes less sensitive. Thus, if the parameter $\theta_1$ is made larger, the method will generally take longer to detect that a problem is likely to occur, is occurring, will occur, etc., but the method will also be less susceptible to false alarms. Similarly, as the parameter $\theta_1$ is made smaller, it may take less time to detect that a problem is likely to occur, is occurring, will occur, etc., but the method will also likely be more susceptible to false alarms.

The parameter $\theta_1$ can be selected in a variety of ways. For example, an operator could choose a suitable value. Also, the parameter $\theta_1$ could be based on the predicted value $Y_P$. For example, it could be selected as some percentage of $Y_P$, such as 1% of $Y_P$, 2% of $Y_P$, 3% of $Y_P$, 4% of $Y_P$, 5% of $Y_P$, etc. Additionally, the value of the parameter $\theta_1$ could be based on statistics of Z. For example, the value of the parameter $\theta_1$ could be based on a mean of Z, a standard deviation of Z, a variance of Z, a range of Z, etc. As a specific example, the value of the parameter $\theta_1$ could be selected C$\sigma$, where C is some real number. In this example, the equation 1 can be rewritten as:

$$\Lambda_{NEW} = \Lambda_{OLD} + \frac{C}{\sigma}\left(Z - \frac{C\sigma}{2}\right) = \Lambda_{OLD} + \frac{CZ}{\sigma} - \frac{C^2}{2} \quad \text{(Equ. 3)}$$

Suitable values of C may depend on the particular implementation and/or the particular process being monitored. Possible values of C may include 3 or 6, for example.

Referring again to FIG. 11, at a block 420, it is determined whether the value $\Lambda_{NEW}$ is less than a threshold B. If the value $\Lambda_{NEW}$ is less than the threshold B, it is determined that the process is in a normal state at a block 424. Then, the flow proceeds back to the block 404, where the variable $\Lambda_{OLD}$ is cleared to zero. Selection of the threshold B will be described subsequently.

If at the block 420, it is determined that the value $\Lambda_{NEW}$ is not less than the threshold B, the flow may proceed to a block 428, at which it is determined whether the value $\Lambda_{NEW}$ is greater than a threshold A. If the value $\Lambda_{NEW}$ is greater than the threshold A, it is determined that the process is in an abnormal state at a block 432. Then, a significant deviation indicator is generated at a block 436. Next, the flow proceeds back to the block 404, where the variable $\Lambda_{OLD}$ is cleared to zero. Selection of the threshold A will be described subsequently.

If at the block 428, it is determined that the value $\Lambda_{NEW}$ is not greater than the threshold A, the flow may proceed to a block 440, at which it is determined that the state is indeterminate. Then, at a block 444, the variable $\Lambda_{OLD}$ is set to the value $\Lambda_{NEW}$ determined at the block 416. Next, the flow proceeds back to the block 408 at which the next values of Y and $Y_P$ are received.

The threshold A may chosen as:

$$A = \ln\left(\frac{1-\beta}{\alpha}\right) \quad \text{(Equ. 4)}$$

where $\alpha$ is a false alarm probability and $\beta$ is a missed alarm probability. Similarly, the threshold B may be chosen as:

$$B = \ln\left(\frac{\beta}{1-\alpha}\right) \quad \text{(Equ. 5)}$$

With regard to the false alarm probability $\alpha$ and the missed alarm probability $\beta$, it is generally preferable to favor missed alarms over false alarms when performing diagnostics for industrial processes. For instance, if an alarm is missed by the deviation detector 116 (FIG. 3), the plant personnel are no worse off than if the deviation detector 116 was not being used. However, if the deviation detector 116 generates false alarms, an operator may be tempted to deactivate the deviation detector 116 and cease using it. Thus, the false alarm probability $\alpha$ typically should be much smaller than the missed alarm probability $\beta$. Of course, this need not be the case in all applications. For instance, there may be particular implementations in which false alarms are preferable to missed alarms.

With the typical situation in which missed alarms are preferable to false alarms, reasonable values for the false alarm probability $\alpha$ may be, for example, 0.00005, 0.0001, 0.00015, 0.0002, 0.00025, etc., and reasonable values for the missed alarm probability $\beta$ may be, for example, 0.05, 0.06, 0.07, 0.08, 0.09, 0.1, 0.11, etc. Of course, other values of the false alarm probability $\alpha$ and the missed alarm probability $\beta$ may be utilized.

A system such as the system 350 of FIG. 10 may be used to implement the method 400 of FIG. 11. Parameters, such as $\theta_1$, the false alarm probability $\alpha$, and the missed alarm probability $\beta$, may be configurable using the configuration application 38, for example.

Examples of Implementing AOD Systems in One or More Process Plant Devices

Figure 12:
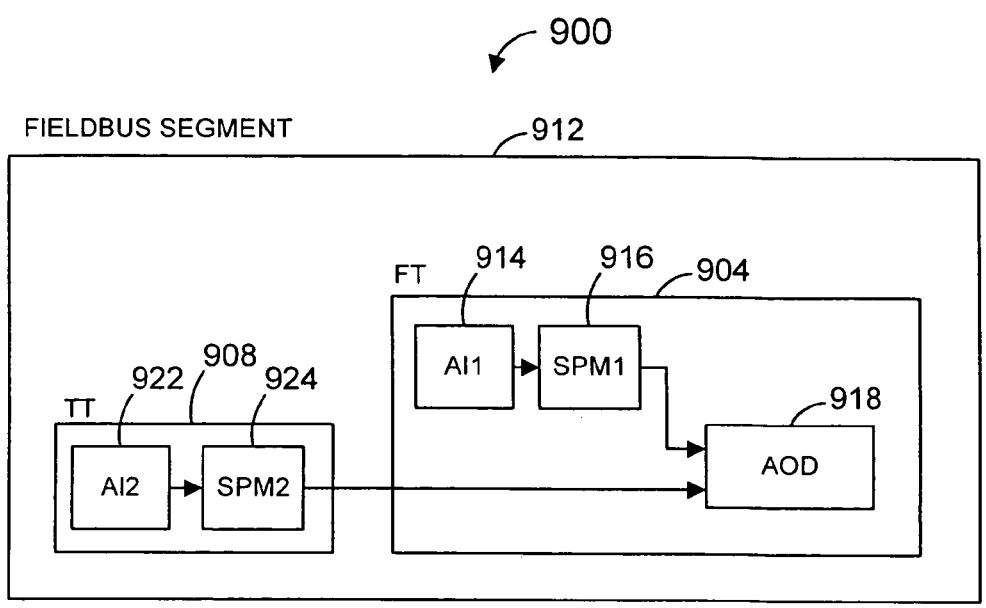
FIG. 12 is a block diagram of yet another example AOD system implemented on a Fieldbus segment of a process plant.

As described previously, AOD systems such as those described herein, may be implemented in a variety of devices within a process plant. FIG. 12 is a block diagram showing one possible way in which an AOD system may be implemented in a process plant. In FIG. 12, a Fieldbus system 900 includes a flow transmitter 904 and a temperature transmitter 908 on a same Fieldbus segment 912. The flow transmitter 904 may implement an analog input function block 914 and an SPM block 916. Additionally, the flow transmitter 904 may implement an abnormal operation detection function block 918. The function block 918 may include a deviation detector that functions in a manner similar to that described above with respect to any of FIGS. 3-11, for example. The temperature transmitter 908 may implement an analog input function block 922 and an SPM block 924.

In operation, the analog input function block 914 may provide a process variable signal to the SPM block 916. In turn, the SPM block 916 may generate one or more statistical signals based on the process variable signal, and may provide the statistical signals to the abnormal operation detection function block 918. Similarly, the analog input function block 922 may provide a process variable signal to the SPM block 924. In turn, the SPM block 924 may generate one or more statistical signals based on the process variable signal, and may provide the statistical signals to the abnormal operation detection function block 918 via the Fieldbus segment 912.

In another implementation, the SPM blocks 916 and 924 may be incorporated within the abnormal operation detection function block 918. In this implementation, the analog input function block 914 may provide its process variable signal to the abnormal operation detection function block 918. Similarly, the analog input function block 922 may provide its process variable signal to the abnormal operation detection function block 918 via the Fieldbus segment 912. Of course, as described above, SPM blocks may not always be utilized in connection with abnormal operation detection function block 918, and thus may be omitted in some implementations.

As is known, some field devices are capable of making sensing of two or more process variables. Such a field device may be capable of implementing all of blocks 914, 916, 918, 922, and 924.

Figure 13:
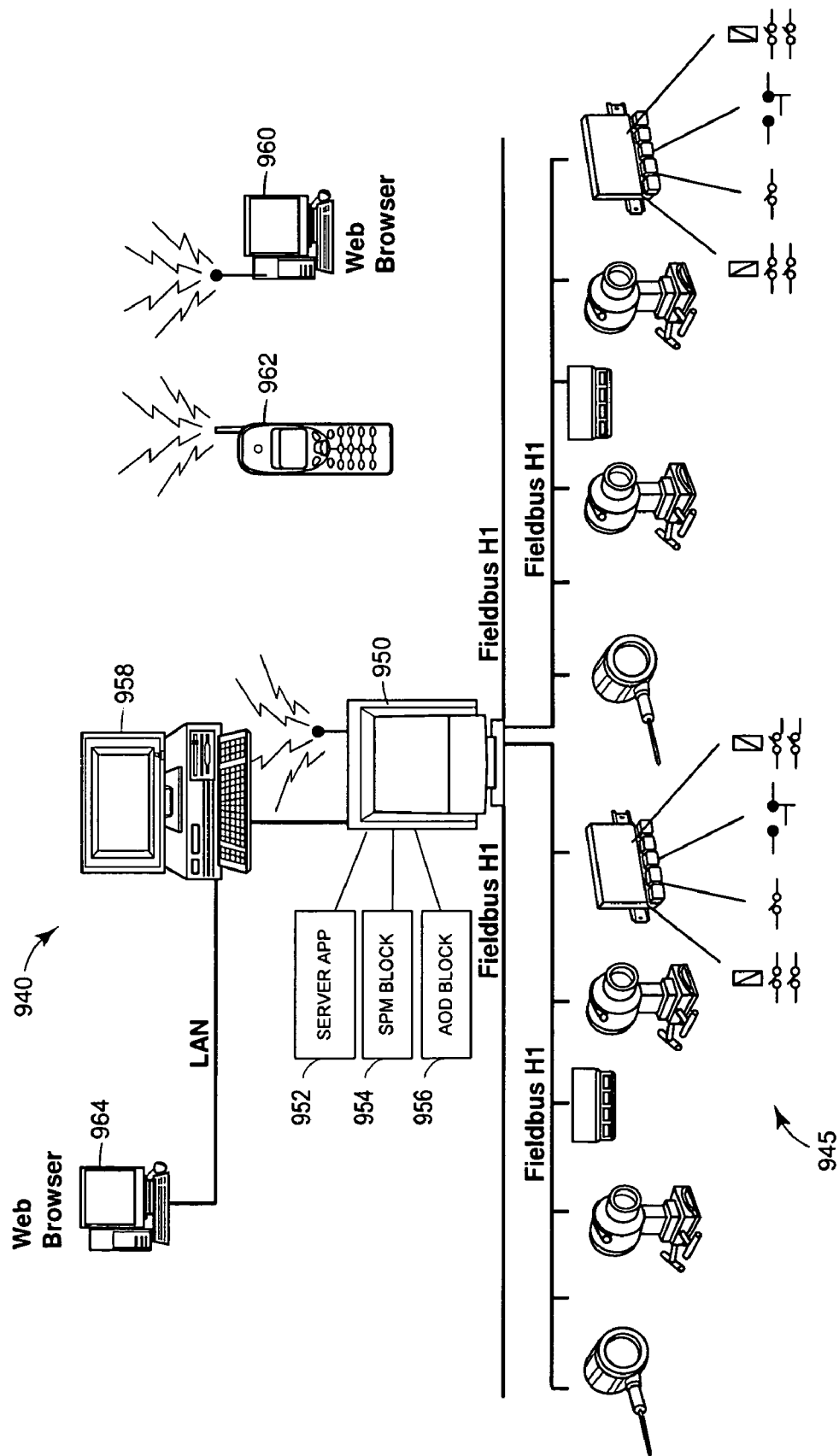
FIG. 13 is a depiction of an interface device connected within a further process plant to facilitate implementation of one or more AOD systems.

FIG. 13 illustrates another manner of implementing AOD systems in a process plant. In the system 940 of FIG. 13, some or all of the abnormal situation prevention application 35, the configuration application 38, and/or the alert/alarm application 43 may be stored in a device other than a host workstation or personal computer. The example system 940 of FIG. 13 includes a set of field devices 945 (illustrated as Fieldbus field devices, but they could be other types of devices as well) connected to an interface device 950, which may be, for example, the Rosemount 3420 device. In this case, the interface device 950, which is not a personal computer, may include some or all of the functionality of the abnormal situation prevention system 35 described above. In particular, the interface device 950 may include a server application 952 to receive and organize data delivered from the field devices 945 (which may be various different types of field devices). If desired, this server application 952 may include an OPC server. The configuration application 38 (or a portion of it) may also be stored in a memory of, and executed on a processor of, the interface device 950 to allow configuration of AOD blocks, SPM blocks, detection logic, models, etc., as described above. Additionally, the interface device 950 may include one or more SPM blocks 954 therein to collect process variable data directly from one or more of the field devices (such as field devices which do not include SPM blocks or functionality) and to generate SPM parameters, as discussed above. Further, the interface device 950 may include one or more AOD blocks 956 therein to receive the SPM parameters and/or process variable data from field devices and to generate indicators of deviation, as discussed above. In this manner, the SPM blocks 954 and/or the AOD blocks 956 stored in and executed in the interface device 950 are able to compensate for the lack of SPM blocks and/or AOD blocks within certain ones of the field devices 945 and may be used to provide SPM data for field devices which do not themselves support SPM blocks or SPM functionality and/or models and deviation detectors for field devices which do not themselves support AOD blocks or AOD functionality. Also, because the interface device 950 may typically have more memory and more processing power than a field device, implementing SPM blocks and/or AOD blocks in the interface device 950 may permit more complex AOD analysis to be performed.

The interface device 950 may communicate with other devices such as a host workstation 958 via a hardwired connection, such as a 2-wire, a 3-wire, a 4-wire, etc. connection, to provide SPM data, or data developed therefrom, such as alerts, data plots, etc. to those devices for viewing by a user. Additionally, as illustrated in FIG. 13, the interface device 950 may be connected via one or more wireless communication connections to a web browser 960 and to a handheld computing device 962, such as a telephone, a personal data assistant (PDA), a laptop computer, etc. In this example, an application may be stored in and executed in other devices, such as the host workstation 958, in the web browser 960 or in the handheld computing device 962 and these applications may communicate with the interface device 950 to obtain data for the application. If desired, the devices 958, 960 and 962 may include the configuration application 38 to enable a user to configure AOD blocks and/or SPM blocks implemented in the interface device 950. Likewise, as illustrated in FIG. 13, the data from the interface device 950 may be accessed indirectly from the host 958 by a web browser 964 and provided to other users via any desired web connection. Of course, the interface device 950 may include a web server therein and may communicate with any other device, such as the devices 958, 960, 962, and 964 using any desired protocol, such as OPC, Modbus, Ethernet, HTML, XML, etc.

Figure 14:
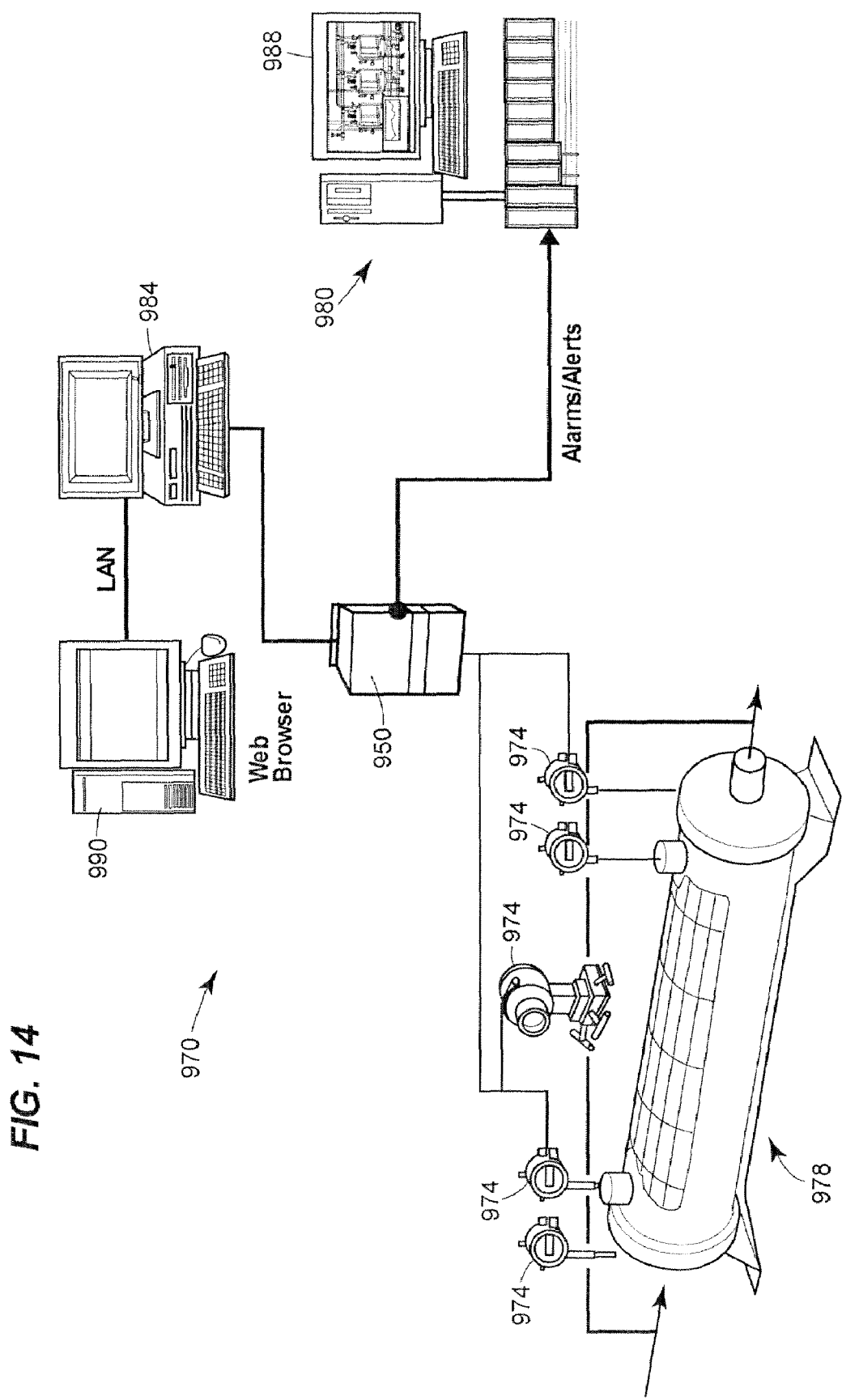
FIG. 14 is a depiction of an interface device connected within still another process plant to facilitate implementation of one or more AOD systems.

FIG. 14 illustrates a further process plant system 970 in which an interface device 950, which may be similar to or the same as that of FIG. 13, is connected between a set of field devices 974 (forming part of a heat exchanger 978) and a process controller system 980. Here, the interface device 950, which may include all of the applications and functionality of the device 950 of FIG. 13, may provide data for viewing to a host 984, and may provide alerts or alarms generated by AOD systems or other systems to the controller system 980. The controller system 980 may integrate these alerts or alarms with other controller type alerts and alarms for viewing by, for example, a control operator at an operator workstation 988. Of course, if desired, the host workstation 984 may include any desired viewing application to view the data collected in and provided by the interface device 950 in any desired manner, including any of those discussed herein. Likewise, this data may be made available for viewing by other users via a web browser 990. Thus, as will be understood, the various applications discussed herein as being associated with the abnormal situation prevention system 35, the SPM blocks (if used), and the AOD systems may be distributed in different devices. For instance, data (such as SPM data) may be collected in one device, such as a field device 974, and sent to another device, such as in the interface device 950, that implements an AOD system. Alerts, alarms, or other indicators generated by the AOD system may be sent to yet another device, such as the workstation 988, for presentation to a user. Likewise, configuration information may be input via a user interface device, such as a host, a web browser, a PDA, etc. and sent to a different device, such as the interface device 950, for configuring an AOD system.

One of ordinary skill in the art will recognize that the example systems and methods described above may be modified in various ways. For example, blocks may be omitted, reordered, or combined, additional blocks may be added, etc. The AOD systems, models, deviation detectors, logic blocks, system blocks, method blocks, etc., described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for facilitating detection of abnormal operation of a process in a process plant, comprising:
    receiving process variable data associated with the process plant;
    generating predicted process variable data using a model;
    generating a difference signal based on the received process variable data and the predicted process variable data;
    detecting whether the difference signal is increasingly deviating from zero over a plurality of values of the difference signal using a processor hardware device; and
    generating an indicator of significant deviation based on whether the difference signal is increasingly deviating from zero using the processor hardware device;
    wherein detecting whether the difference signal is increasingly deviating from zero comprises at least one of:
        determining whether $Z_{k1} > Z_{k2} > \ldots > Z_{kB} > X$, wherein $Z_{k1}, Z_{k2}, \ldots, Z_{kB}$ are at least a subset of B values within a set of A consecutive values of the difference signal at time indexes k1, k2, . . . kB, wherein A is a positive integer greater than 2, B is a positive integer less than or equal to A and greater than 2, wherein X is a first threshold, and wherein k1>k2 . . . >kB; and
        determining whether $Z_{k1} < Z_{k2} < \ldots < Z_{kB} < Y$, wherein Y is a second threshold.

2. A method according to claim 1, wherein detecting whether the difference signal is increasingly deviating from zero comprises at least one of:
    detecting whether a rate of change of the difference signal is greater than a first threshold;
    detecting whether the rate of change of the difference signal is less than a second threshold; and
    detecting whether a first derivative of the difference signal is greater than a third threshold;
    detecting whether the first derivative of the difference signal is less than a fourth threshold;
    detecting whether a second derivative of the difference signal is greater than a fifth threshold; and
    detecting whether the second derivative of the difference signal is less than a sixth threshold.

3. A method according to claim 1, wherein B<A.

4. A method according to claim 3, wherein detecting whether the difference signal is increasingly deviating from zero further comprises at least one of:
- detecting whether a rate of change of the difference signal is greater than a first threshold;
- detecting whether the rate of change of the difference signal is less than a second threshold; and
- detecting whether a first derivative of the difference signal is greater than a third threshold;
- detecting whether the first derivative of the difference signal is less than a fourth threshold;
- detecting whether a second derivative of the difference signal is greater than a fifth threshold; and
- detecting whether the second derivative of the difference signal is less than a sixth threshold.

5. A method according to claim 1, wherein detecting whether at least the subset of values in the set of values of the difference signal are increasingly deviating from zero comprises at least one of:
- detecting whether the difference signal includes a first number of consecutively increasing values; and
- detecting whether the difference signal includes a second number of consecutively decreasing values.

6. A method according to claim 1, wherein detecting whether at least the subset of values in the set of values of the difference signal are increasingly deviating from zero comprises:
- detecting whether at least the subset of values in the set of values of the difference signal are increasingly deviating from zero in a positive direction, and detecting whether at least the subset of values in the set of values of the difference signal are increasingly deviating from zero in a negative direction;

the method further comprising:
- generating an indicator of an upward trend based on whether the at least the subset of values in the set of values of the difference signal are increasingly deviating from zero in the positive direction;
- generating an indicator of a downward trend based on whether the at least the subset of values in the set of values of the difference signal are increasingly deviating from zero in the negative direction.

7. A method according to claim 1, wherein A equals B, X=0 and Y=0.

8. A method according to claim 1, wherein the difference signal is an absolute value of a difference between the received process variable data and the predicted process variable data.

9. A computer readable medium storing machine readable instructions, the machine readable instructions capable of causing one or more machines to:
- receive process variable data associated with a process plant;
- generate predicted process variable data using a model;
- generate a difference signal based on the received process variable data and the predicted process variable data;
- detect whether the difference signal is increasingly deviating from zero over a plurality of values of the difference signal; and
- generate an indicator of significant deviation based on whether the difference signal is increasingly deviating from zero;

wherein the machine readable instructions capable of causing one or more machines to detect whether the difference signal is increasingly deviating from zero comprises machine readable instructions capable of causing one or more machines to, at least one of:
- determine whether $Z_{k1}>Z_{k2}>\ldots>Z_{kB}>X$, wherein $Z_{k1}, Z_{k2},\ldots,Z_{kB}$ are at least a subset of B values within a set of A consecutive values of the difference signal at time indexes k1, k2, ... kB, wherein A is a positive integer greater than 2, B is a positive integer less than or equal to A, wherein X is a first threshold, and wherein k1>k2 ... >kB; and
- determine whether $Z_{k1}<Z_{k2}<\ldots<Z_{kB}<Y$, wherein Y is a second threshold.

10. A system for facilitating detection of abnormal operation of a process in a process plant, comprising:
- at least one computer readable medium;
- at least one processor coupled to the at least one computer readable medium, the processor configured according to executable instructions stored on the at least one computer readable medium to:
- receive process variable data associated with the process plant,
- receive predicted process variable data generated using a model,
- generate a difference signal based on the received process variable data and the predicted process variable data,
- detect whether the difference signal is increasingly deviating from zero over a plurality of values of the difference signal, and
- generate an indicator of significant deviation based on whether the difference signal is increasingly deviating from zero;

wherein the processor is configured to, at least one of:
- determine whether $Z_{k1}>Z_{k2}>\ldots>Z_{kB}>X$, wherein $Z_{k1}, Z_{k2},\ldots,Z_{kB}$ are at least a subset of B values within a set of A consecutive values of the difference signal at time indexes k1, k2, ... kB, wherein A is a positive integer greater than 2, B is a positive integer less than or equal to A, wherein X is a first threshold, and wherein k1>k2 ... >kB; and
- determine whether $Z_{k1}<Z_{k2}<\ldots<Z_{kB}<Y$, wherein Y is a second threshold.

11. A method for facilitating detection of abnormal operation of a process in a process plant, comprising:
- receiving process variable data associated with the process plant;
- generating predicted process variable data using a model;
- generating a difference signal based on the received process variable data and the predicted process variable data;
- detecting whether the difference signal is increasingly deviating from zero over a plurality of values of the difference signal using a processor hardware device; and
- generating an indicator of significant deviation based on whether the difference signal is increasingly deviating from zero using the processor hardware device;

wherein detecting whether the difference signal is increasingly deviating from zero comprises at least one of:
- detecting whether a rate of change of the difference signal is greater than a first threshold;
- detecting whether the rate of change of the difference signal is less than a second threshold; and
- detecting whether a first derivative of the difference signal is greater than a third threshold;
- detecting whether the first derivative of the difference signal is less than a fourth threshold;
- detecting whether a second derivative of the difference signal is greater than a fifth threshold; and detecting whether the second derivative of the difference signal is less than a sixth threshold.

12. A method according to claim 11, wherein detecting whether at least the subset of values in the set of values of the difference signal are increasingly deviating from zero comprises:

detecting whether at least the subset of values in the set of values of the difference signal are increasingly deviating from zero in a positive direction, and detecting whether at least the subset of values in the set of values of the difference signal are increasingly deviating from zero in a negative direction;

the method further comprising:

generating an indicator of an upward trend based on whether the at least the subset of values in the set of values of the difference signal are increasingly deviating from zero in the positive direction;

generating an indicator of a downward trend based on whether the at least the subset of values in the set of values of the difference signal are increasingly deviating from zero in the negative direction.

13. A method according to claim 11, wherein the difference signal is an absolute value of a difference between the received process variable data and the predicted process variable data.

14. A computer readable medium storing machine readable instructions, the machine readable instructions capable of causing one or more machines to:

receive process variable data associated with a process plant;

generate predicted process variable data using a model;

generate a difference signal based on the received process variable data and the predicted process variable data;

detect whether the difference signal is increasingly deviating from zero over a plurality of values of the difference signal; and generate an indicator of significant deviation based on whether the difference signal is increasingly deviating from zero;

wherein the machine readable instructions capable of causing one or more machines to detect whether the difference signal is increasingly deviating from zero comprises machine readable instructions capable of causing one or more machines to, at least one of:

detect whether a rate of change of the difference signal is greater than a first threshold;

detect whether the rate of change of the difference signal is less than a second threshold; and detect whether a first derivative of the difference signal is greater than a third threshold;

detect whether the first derivative of the difference signal is less than a fourth threshold;

detect whether a second derivative of the difference signal is greater than a fifth threshold; and detect whether the second derivative of the difference signal is less than a sixth threshold.

15. A system for facilitating detection of abnormal operation of a process in a process plant, comprising:

at least one computer readable medium;

at least one processor coupled to the at least one computer readable medium, the processor configured according to executable instructions stored on the at least one computer readable medium to:

receive process variable data associated with the process plant, receive predicted process variable data generated using a model, generate a difference signal based on the received process variable data and the predicted process variable data, detect whether the difference signal is increasingly deviating from zero over a plurality of values of the difference signal, and generate an indicator of significant deviation based on whether the difference signal is increasingly deviating from zero;

wherein the processor configured to, at least one of:

detect whether a rate of change of the difference signal is greater than a first threshold;

detect whether the rate of change of the difference signal is less than a second threshold; and detect whether a first derivative of the difference signal is greater than a third threshold;

detect whether the first derivative of the difference signal is less than a fourth threshold;

detect whether a second derivative of the difference signal is greater than a fifth threshold; and detect whether the second derivative of the difference signal is less than a sixth threshold.

* * * * *